*(12)* United States Patent
Kawai et al.

(10) Patent No.: US 8,982,253 B2
(45) Date of Patent: Mar. 17, 2015

(54) COLOR IMAGING ELEMENT

(71) Applicant: FUJIFILM Corporation, Tokyo (JP)

(72) Inventors: Tomoyuki Kawai, Saitama (JP);
Kenkichi Hayashi, Saitama (JP); Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/314,555

(22) Filed: Jun. 25, 2014

(65) Prior Publication Data

US 2014/0307132 A1 Oct. 16, 2014

Related U.S. Application Data

(63) Continuation of application No. PCT/JP2012/083840, filed on Dec. 27, 2012.

(30) Foreign Application Priority Data

Dec. 27, 2011 (JP) .................................. 2011-286008

(51) Int. Cl.
*H04N 3/14* (2006.01)
*H04N 5/335* (2011.01)
(Continued)

(52) U.S. Cl.
CPC . *H04N 9/64* (2013.01); *H04N 9/07* (2013.01); *H04N 9/045* (2013.01); *H04N 2209/045* (2013.01)
USPC ............ 348/272; 348/273; 348/277; 348/280

(58) Field of Classification Search
USPC .................................. 348/272, 273, 277, 280
See application file for complete search history.

(56) References Cited

U.S. PATENT DOCUMENTS 7,864,232 B2 * 1/2011 Kinoshita et al. ............. 348/272
8,754,967 B2 * 6/2014 Hirota ........................... 348/275
(Continued)

FOREIGN PATENT DOCUMENTS

JP 58-219889 A 12/1983
JP 8-023542 A 1/1996
(Continued)

OTHER PUBLICATIONS

International Preliminary Report on Patentability issued in PCT/JP2012/083840, completed on Nov. 18, 2013.
(Continued)

*Primary Examiner* — Yogesh Aggarwal
(74) *Attorney, Agent, or Firm* — Birch, Stewart, Kolasch & Birch, LLP

(57) ABSTRACT

A single-plate color imaging element where an array of the color filters includes a basic array pattern of M×N provided with first filters corresponding to a first color with one or more colors and second filters corresponding to a second color with two or more colors with contribution ratios for obtaining luminance signals lower than the first color, the first filters are arranged in a check pattern shape in the basic array pattern, one or more second filters corresponding to each color of the second color are arranged in each line in the horizontal and vertical directions of the array of the color filters in the basic array pattern, and a proportion of the number of pixels of the first color corresponding to the first filters is greater than a proportion of the number of pixels of each color of the second color corresponding to the second filters.

16 Claims, 21 Drawing Sheets

(51) Int. Cl.
*H04N 9/64* (2006.01)
*H04N 9/07* (2006.01)
*H04N 9/04* (2006.01)

(56) References Cited

U.S. PATENT DOCUMENTS

| | | | |
|---|---|---|---|
| 2002/0149686 A1* | 10/2002 | Taubman | 348/272 |
| 2004/0109068 A1 | 6/2004 | Mitsunaga et al. | |
| 2004/0169747 A1 | 9/2004 | Ono et al. | |
| 2006/0012808 A1 | 1/2006 | Mizukura et al. | |
| 2006/0203113 A1* | 9/2006 | Wada et al. | 348/302 |
| 2007/0153104 A1 | 7/2007 | Ellis-Monaghan et al. | |
| 2008/0131028 A1 | 6/2008 | Pillman et al. | |
| 2008/0151083 A1 | 6/2008 | Hains et al. | |
| 2011/0069189 A1 | 3/2011 | Venkataraman et al. | |
| 2012/0025060 A1 | 2/2012 | Iwata | |

FOREIGN PATENT DOCUMENTS

| | | |
|---|---|---|
| JP | 8-023543 A | 1/1996 |
| JP | 11-285012 A | 10/1999 |
| JP | 2000-308080 A | 11/2000 |
| JP | 2003-284084 A | 10/2003 |
| JP | 2004-221839 A | 8/2004 |
| JP | 2004-266369 A | 9/2004 |
| JP | 2005-136766 A | 5/2005 |
| JP | 2007-184904 A | 7/2007 |
| JP | 2007-306490 A | 11/2007 |
| JP | 2008-236620 A | 10/2008 |
| JP | 2010-512048 A | 4/2010 |
| JP | 2010-153511 A | 7/2010 |
| JP | 2011-523538 A | 8/2011 |
| WO | WO 02/056604 A1 | 7/2002 |
| WO | WO 2008/066698 A2 | 10/2008 |
| WO | WO 2009/151903 A2 | 12/2009 |

OTHER PUBLICATIONS

International Search Report issued in PCT/JP2012/083840, mailed on Jan. 29, 2013.
Office Action issued in Chinese Patent Application No. 201180022503.3, issued on May 23, 2013.
Written Opinion of the International Searching Authority issued in PCT/JP2012/080898, mailed on Jan. 22, 2013.
Written Opinion of the International Searching Authority issued in PCT/JP2012/080899, mailed on Jan. 15, 2013.
Written Opinion of the International Searching Authority issued in PCT/JP2012/081644, mailed on Jan. 15, 2013.
Written Opinion of the International Searching Authority issued in PCT/JP2012/083583, mailed on Jan. 29, 2013.
Written Opinion of the International Searching Authority issued in PCT/JP2012/083840, mailed on Jan. 29, 2013.

* cited by examiner

COLOR IMAGING ELEMENT

CROSS-REFERENCE TO RELATED APPLICATIONS

This application is a Continuation of PCT International Application No. PCT/JP2012/083840 filed on Dec. 27, 2012, which claims priority under 35 U.S.C. §119 (a) to Japanese Patent Application No. 2011-286008 filed on Dec. 27, 2011. Each of the above application(s) is hereby expressly incorporated by reference, in its entirety, into the present application.

BACKGROUND OF THE INVENTION

1. Field of the Invention

The present invention relates to a color imaging element, and particularly, to a color imaging element that can suppress generation of color moire and increase resolution.

2. Description of the Related Art

An output image of a single-plate color imaging element is a RAW image (mosaic image). Therefore, a multi-channel image is obtained by a process of interpolating (demosaic process) a pixel of a missing color from a surrounding pixel. In this case, there is a problem in reproduction characteristics of a high-frequency image signal. Compared to a black and white imaging element, aliasing easily occurs in an image taken by a color imaging element, and it is important to expand a reproduction band to increase resolution while suppressing generation of color moire (false color).

The demosaicing process is a process of calculating all color information of each pixel from a mosaic image corresponding to a color filter array of the single-plate color imaging element and is also called synchronization processing. For example, in a case of an imaging element including color filters of three RGB colors, the color information of all of RGB is calculated in the process for each pixel from the mosaic image made of RGB.

A primary-color Bayer array as a color array most widely used in the single-plate color imaging element includes green (G) pixels arranged in a check pattern and red (R) and blue (B) arranged line-sequentially. Therefore, G signals have a problem of reproduction accuracy in generation of high frequency signals in oblique directions, and R and B signals have a problem of reproduction accuracy in generation of high frequency signals in horizontal and vertical directions.

A black and white vertical-striped pattern (high frequency image) as shown in (A) portion of FIG. 20 enters an imaging element in a Bayer array shown in (B) portion of FIG. 20, and the pattern is sorted into Bayer color arrays to compare the colors. As shown in (C) to (E) portions of FIG. 20, R forms a light and flat color image, B forms a dark and flat color image, and G forms a light and dark mosaic color image. Although there is no density difference (level difference) between RGB with respect to the original black and white image, the image is colored depending on the color array and the input frequency.

Similarly, a black and white oblique high frequency image as shown in (A) portion of FIG. 21 enters an imaging element in a Bayer array shown in (B) portion of FIG. 21, and the image is sorted into Bayer color arrays to compare the colors. As shown in (C) to (E) portions of FIG. 21, R and B form light and flat color images, while G forms a dark and flat color image. Assuming that the value of black is 0 and the value of white is 255, the black and white oblique high frequency image turns green, because only G is 255. In this way, the oblique high frequency image cannot be correctly reproduced in the Bayer array.

In the imaging apparatus using the single-plate color imaging element, an optical low-pass filter formed by an anisotropic substance such as crystal is generally arranged on the front side of the color imaging element to prevent optically reducing the high frequency wave. However, although the coloring caused by folding of the high frequency signal can be reduced in the method, there is a problem that the resolution is reduced accordingly.

To solve the problem, a color imaging element is proposed, wherein a color filter array of the color imaging element is a three-color random array satisfying array restrictions in which an arbitrary target pixel is adjacent to three colors including the color of the target pixel on four sides of the target pixel (Japanese Patent Application Laid-Open No. 2000-308080; PTL 1).

An image sensor of a color filter array is also proposed, wherein the image sensor includes a plurality of filters with different spectral sensitivity, and first and second filters among the plurality of filters are alternately arranged in a first predetermined period in one of the diagonal directions of a pixel grid of the image sensor and are alternately arranged in a second predetermined period in the other diagonal direction (Japanese Patent Application Laid-Open No. 2005-136766; PTL 2).

A color array is further proposed, wherein in a color solid-state imaging element of three primary colors of RGB, sets of three pixels including horizontally arranged R, G, and B are arranged in a zigzag manner in the vertical direction to make appearance frequencies of RGB equal and to cause arbitrary lines (horizontal, vertical, and oblique lines) on an imaging plane to pass through all colors (Japanese Patent Application Laid-Open No. 11-285012; PTL 3).

Furthermore, a color imaging element is also proposed, wherein R and B among the three primary colors of RGB are arranged every three pixels in horizontal and vertical directions, and G is arranged between R and B (Japanese Patent Application Laid-Open No. 8-23543; PTL 4).

SUMMARY OF THE INVENTION

In the color imaging element described in PTL 1, the filter arrays are random, and each random pattern needs to be optimized in a demosaicing process in a later stage. There is a problem that the demosaicing process is cumbersome. Although the random arrays are effective for color moire in a low frequency wave, the random arrays are not effective for a false color at a high frequency section.

In the image sensor described in PTL 2, the G pixels (luminance pixels) are arranged in a check pattern. Therefore, there is a problem that the pixel reproduction accuracy in a limit resolution area (particularly in oblique directions) is not excellent.

The color solid-state imaging element described in PTL 3 includes filters of all colors on arbitrary lines and has an advantage that the generation of false color can be suppressed. However, the proportions of the numbers of pixels of RGB are equal, and there is a problem that the high frequency reproducibility is lower than that in a Bayer array. In the Bayer array, the proportion of the number of pixels of G that most contributes to obtaining luminance signals is twice the proportions of the numbers of pixels of R and B.

Meanwhile, in the color imaging element described in PTL 4, the proportion of the number of pixels of G with respect to the numbers of pixels of R and B is greater than that in the Bayer array, but there are lines with only G pixels in the horizontal or vertical direction. Therefore, the color imaging element is not effective for the false color at a high frequency section in the horizontal or vertical direction.

The present invention has been made in view of the circumstances, and an object of the present invention is to provide a color imaging element that can suppress the generation of false color and increase the resolution and that can simplify the process of a later stage compared to the conventional random array.

To attain the object, a color imaging element according to an aspect of the present invention is a single-plate color imaging element including color filters arranged on a plurality of pixels formed by photoelectric conversion elements arranged in horizontal and vertical directions, wherein an array of the color filters includes a basic array pattern of M×N (M, N: integers 4 or more, at least one of M and N is an odd number, and M≠N) provided with first filters corresponding to a first color with one or more colors and second filters corresponding to a second color with two or more colors with contribution ratios for obtaining luminance signals lower than the first color, the basic array pattern is repeatedly arranged in the horizontal and vertical directions, the first filters are arranged in a check pattern shape in the basic array pattern, one or more second filters corresponding to each color of the second color are arranged in each line in the horizontal and vertical directions of the array of the color filters in the basic array pattern, and a proportion of the number of pixels of the first color corresponding to the first filters is greater than a proportion of the number of pixels of each color of the second color corresponding to the second filters.

According to the color imaging element of the aspect of the present invention, the basic array pattern of M×N (M, N: integers 4 or more, at least one of M and N is an odd number, and M≠N) provided with the first filters corresponding to the first color with high contribution ratios for obtaining the luminance signals and the second filters corresponding to a second color with two or more colors other than the first color is repeatedly arranged in the horizontal and vertical directions. As a result, a process can be executed according to the repeated pattern in a demosaicing process in a later stage, and processing in the later stage can be simplified compared to the conventional random array.

The first filters are arranged in the check pattern shape in the basic array pattern. As a result, the first filters are arranged in each line in the horizontal, vertical, upper right, and lower right directions of the array of the color filters, and the reproduction accuracy of the demosaicing process in a high frequency area can be improved. Furthermore, one or more second filters are arranged in each line in the horizontal and vertical directions of the array of the color filters in the basic array pattern. This can suppress the generation of color moire (false color) to increase the resolution.

The first and second filters are arranged so that the proportion of the number of pixels of the first color corresponding to the first filters is greater than the a proportion of the number of pixels of each color of the second color corresponding to the second filters. As a result, aliasing can be suppressed, and high frequency reproducibility is excellent.

A color imaging element according to an aspect of the present invention provides a single-plate color imaging element including color filters arranged on a plurality of pixels formed by photoelectric conversion elements arranged in horizontal and vertical directions, wherein an array of the color filters includes a basic array pattern including k sub-arrays (k: integer 2 or more) of M×N (M, N: integers, at least one of M and N is an odd number, and M≠N) provided with first filters corresponding to a first color with one or more colors and second filters corresponding to a second color with two or more colors with contribution ratios for obtaining luminance signals lower than the first color, the basic array pattern is repeatedly arranged in the horizontal and vertical directions, the first filters are arranged in a check pattern shape in the sub-arrays, one or more second filters corresponding to each color of the second color are arranged in each line in the horizontal and vertical directions of the array of the color filters in the basic array pattern, and a proportion of the number of pixels of the first color corresponding to the first filters is greater than a proportion of the number of pixels of each color of the second color corresponding to the second filters.

According to the color imaging element of the aspect of the present invention, the basic array pattern including k sub-arrays (k: integer 2 or more) of M×N (M, N: integers, at least one of M and N is an odd number, and M≠N) provided with the first filters corresponding to the first color with high contribution ratios for obtaining the luminance signals and the second filters corresponding to a second color with two or more colors other than the first color is repeatedly arranged in the horizontal and vertical directions. As a result, a process can be executed according to the repeated pattern in the demosaicing process in the later stage, and processing in the later stage can be simplified compared to the conventional random array.

The first filters are arranged in the check pattern shape in the sub-arrays. As a result, the first filters are arranged in each line in the horizontal, vertical, upper right, and lower right directions of the array of the color filters, and the reproduction accuracy of the demosaicing process in the high frequency area can be improved. Furthermore, one or more second filters of each color are arranged in each line in the horizontal and vertical directions of the array of the color filters in the basic array pattern. This can suppress the generation of color moire (false color) to increase the resolution.

The first and second filters are arranged so that the proportion of the number of pixels of the first color corresponding to the first filters is greater than the proportion of the number of pixels of each color of the second color corresponding to the second filters. As a result, aliasing can be suppressed, and high frequency reproducibility is excellent.

In the color imaging element according to another aspect of the present invention, it is preferable that the M is 3, the N is greater than the M, the k is 2, and the basic array pattern is formed by arranging two sub-arrays so that the number of pixels is 2M×N.

In the color imaging element according to another aspect of the present invention, it is preferable that the N is 3, the M is smaller than the N, the k is 4, and the basic array pattern is formed by arranging four sub-arrays so that the number of pixels is 2M×2N.

In the color imaging element according to another aspect of the present invention, it is preferable that the first filters are arranged in each line in the horizontal, vertical, lower right, and upper right directions of the array of the color filters. As a result, the reproduction accuracy of the demosaicing process in the high frequency area can be improved.

In the color imaging element according to another aspect of the present invention, it is preferable that the second filters corresponding to each color of the second color is arranged in each line in the horizontal, vertical, lower right, and upper right directions of the array of the color filters. This can suppress the generation of color moire (false color) to increase the resolution.

In the color imaging element according to another aspect of the present invention, it is preferable that the first color is a green (G) color, and the second color is a red (R) color and a blue (B) color.

In the color imaging element according to another aspect of the present invention, it is preferable that in the basic array pattern, the color filters include R filters, G filters, and B filters corresponding to the colors of red (R), green (G), and blue (B), and the R filters, the G filters, and the B filters are arranged so as not to be adjacent in the horizontal and vertical directions of the array of the color filters. As a result, an arrangement in which the R filters, the G filters, and the B filters are arranged in the horizontal, vertical, upper right, and lower right lines can be easily created.

In the color imaging element according to another aspect of the present invention, it is preferable that the color filters include R filters, G filters, and B filters corresponding to the colors of red (R), green (G), and blue (B), and in the basic array pattern, the R filters, the G filters, and the B filters are arranged in the oblique (NE or NW) direction of the array of the color filters. As a result, the arrangement can be cyclic, and the circuit size of the processing circuit arranged in the later stage can be reduced.

In the color imaging element according to another aspect of the present invention, it is preferable that the color filters include R filters, G filters, and B filters corresponding to the colors of red (R), green (G), and blue (B), and in the basic array pattern, the R filters and the B filters are arranged so that the number of the R filters and the number of the B filters are the same or the difference between the number of the R filters and the number of the B filters is 1, and the R filters and the B filters are irregularly arranged. This can suppress the generation of color moire (false color).

In the color imaging element according to another aspect of the present invention, it is preferable that the color filters include R filters, G filters, and B filters corresponding to the colors of red (R), green (G), and blue (B), and in the sub-arrays, the R filters, the G filters, and the B filters are arranged so as not to be adjacent in the horizontal and vertical directions of the array of the color filters.

In the color imaging element according to another aspect of the present invention, it is preferable that the color filters include R filters, G filters, and B filters corresponding to the colors of red (R), green (G), and blue (B), and in the sub-arrays, the R filters, the G filters, and the B filters are arranged in the upper right or lower right direction of the array of the color filters.

In the color imaging element according to another aspect of the present invention, it is preferable that the color filters include R filters, G filters, and B filters corresponding to the colors of red (R), green (G), and blue (B), and in the sub-arrays, the R filters and the B filters are arranged so that the number of the R filters and the number of the B filters are the same or the difference between the number of the R filters and the number of the B filters is 1, and the R filters and the B filters are irregularly arranged. An imaging apparatus including the color imaging element is also included in the present invention.

According to the present invention, the generation of the false color can be suppressed, the resolution can be increased, and the processing in the later stage can be simplified compared to the conventional random array.

BRIEF DESCRIPTION OF THE DRAWINGS

FIG. 1 is a diagram showing a first embodiment of a single-plate color imaging element according to the present invention.

FIG. 7 is a diagram showing a third embodiment of the single-plate color imaging element according to the present invention.

FIG. 14 is a diagram showing a fifth embodiment of the single-plate color imaging element according to the present invention.

DETAILED DESCRIPTION OF THE PREFERRED EMBODIMENTS

Figure 2:
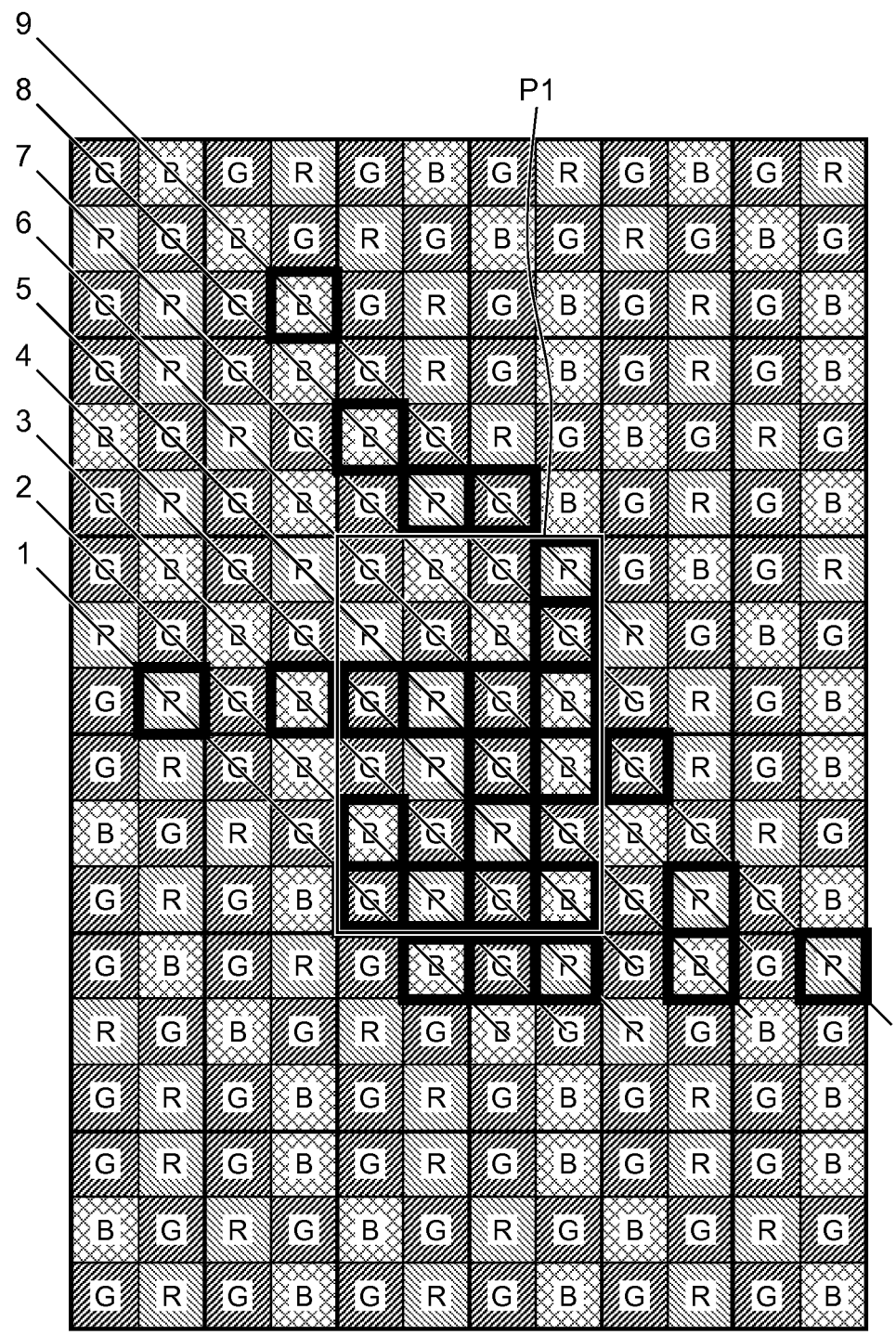
FIG. 2 is a diagram showing existence of color filters of R, G, and B in a lower right direction of the color imaging element of a first embodiment.

Hereinafter, preferred embodiments of a color imaging element according to the present invention will be described in detail with reference to the attached drawings.

<First Embodiment>

Figure 1:
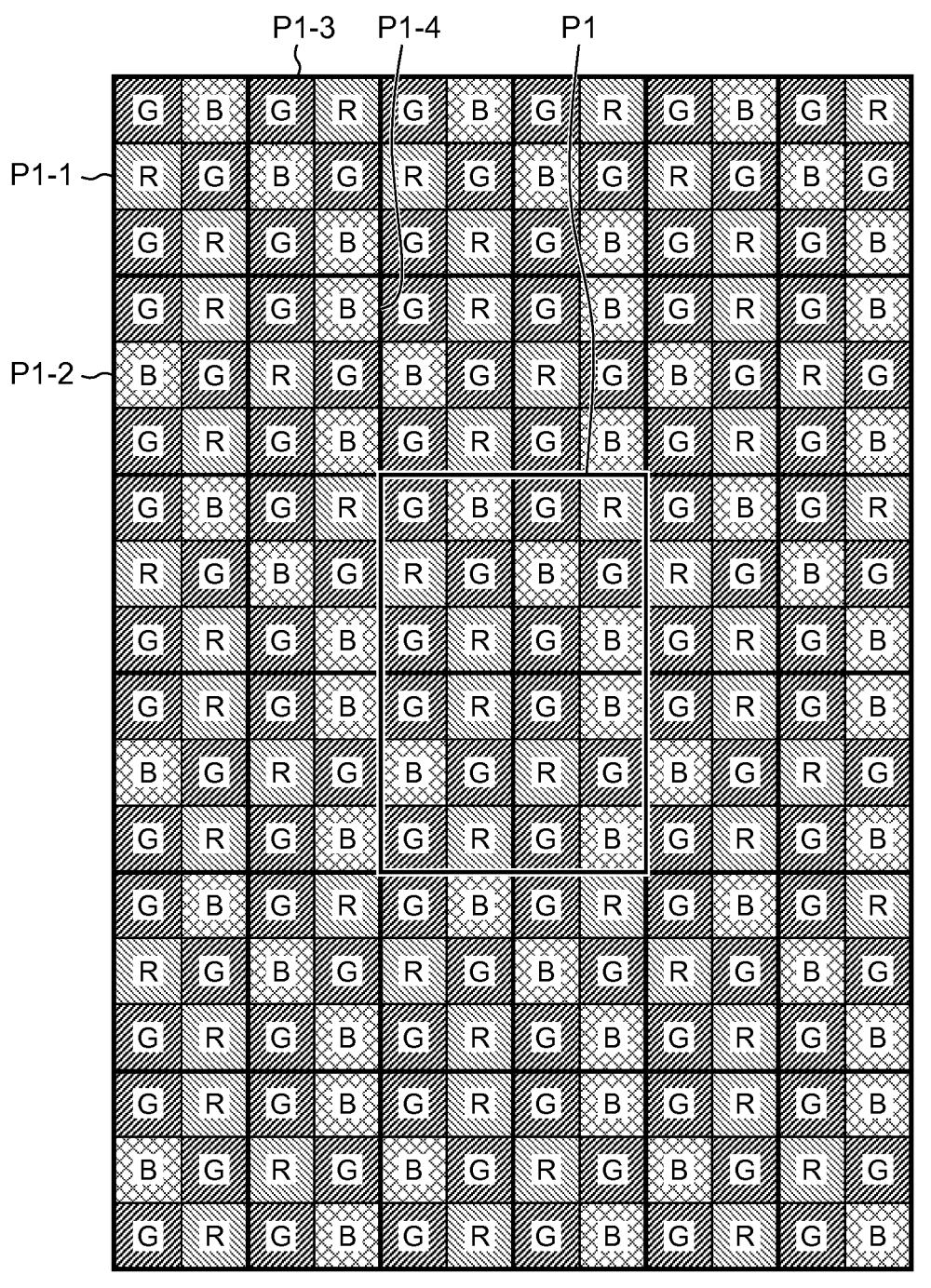

FIG. 1 is a diagram showing a first embodiment of a single-plate color imaging element according to the present invention. FIG. 1 particularly shows a color filter array of color filters arranged on the color imaging element.

This color imaging element includes: a plurality of pixels (not shown) formed by photoelectric conversion elements arranged in horizontal and vertical directions (two-dimensional arrangement); and color filters in a color filter array shown in FIG. 1 arranged on light receiving surfaces of the pixels. One of the color filters of three primary colors of red (R), green (G), and blue (B) is arranged on each pixel.

The color imaging element is not limited to a CCD (Charge Coupled Device) color imaging element and may be another type of imaging element such as a CMOS (Complementary Metal Oxide Semiconductor) imaging element.

<Features of Color Filter Array>

The color filter array of the color imaging element of the first embodiment has the following features (1), (2), (3), (4), and (5).

{Feature (1)}

The color filter array shown in FIG. 1 includes a basic array pattern P1 (pattern indicated by a thick frame) of 4×6 pixels formed by sub-arrays P1-1, P1-2, P1-3, and P1-4 of 2×3 pixels, and the basic array pattern P1 is repeatedly arranged in the horizontal and vertical directions.

The sub-arrays P1-1, P1-2, P1-3, and P1-4 include three pixels in the vertical direction and two pixels in the horizontal direction, and the basic array pattern P1 includes six pixels in the vertical direction and four pixels in the horizontal direction. More specifically, the sub-array includes M×N pixels (M and N are integers, M≠N), and the basic array pattern P1 is formed by arranging four sub-arrays so that the number of pixels is 2M×2N.

The sub-arrays P1-1, P1-2, P1-3, and P1-4 include G filters as luminance pixels arranged in a check pattern shape. The check pattern can also be called a checker pattern. Although the sub-arrays P1-1, P1-2, P1-3, and P1-4 include two G filters arranged on the left column and one G filter arranged on the right column, the arrangement may be opposite.

The sub-arrays P1-1 and P1-3 include R or B filters arranged in a lower right direction. The method of arranging the R or B filters in an oblique direction is not limited to this, and the R or B filters may be arranged in an upper right direction.

The sub-array P1-2 includes the B filter arranged on the left side and the R filters arranged on the right side, and the sub-array P1-4 includes the R filter arranged on the left side and B filters arranged on the right side.

The basic array pattern P1 includes the sub-array P1-1 arranged on the upper left, the sub-array P1-2 arranged below the sub-array P1-1, the sub-array P1-3 arranged on the right side of the sub-array P1-1, and the sub-array P1-4 arranged below the sub-array 1-3. The arrangement of the sub-arrays in the basic array pattern P1 is not limited to this. The sub-arrays may be arranged in any way as long as the basic array pattern P1 includes 4×6 pixels.

Therefore, the color filter array includes filters of R, G, and B colors (R filters, G filters, and B filters) arranged in a cycle.

In this way, the R filters, the G filters, and the B filters are arranged in a cycle. Therefore, a demosaicing process (synchronization processing) and the like of R, G, and B signals read out from the color imaging element can be processed according to the repeated pattern.

When a thinning-out process is executed based on the basic array pattern P1 to reduce the image, the color filter array of the reduced image after the thinning-out process can be the same as the color filter array before the thinning-out process. Therefore, a common processing circuit can be used. The upper right direction is a direction of a diagonal in the upper right direction of the two diagonals of the pixels, and the lower right direction is a direction of a diagonal in the lower right direction of the two diagonals of the pixels. For example, in a case of an array of square pixels, the upper right and lower right directions are directions of 45° from the horizontal direction. In a case of an array of rectangular pixels, the upper right and lower right directions are directions of the diagonals of the rectangle, and the angles may vary depending on the lengths of the long side and the short side.

{Feature (2)}

The color filter array shown in FIG. 1 includes the G filters corresponding to the color (color of G in this embodiment) that most contributes to obtaining the luminance signals arranged in each line in the horizontal, vertical, lower right, and upper right directions of the color filter array.

Figure 3:
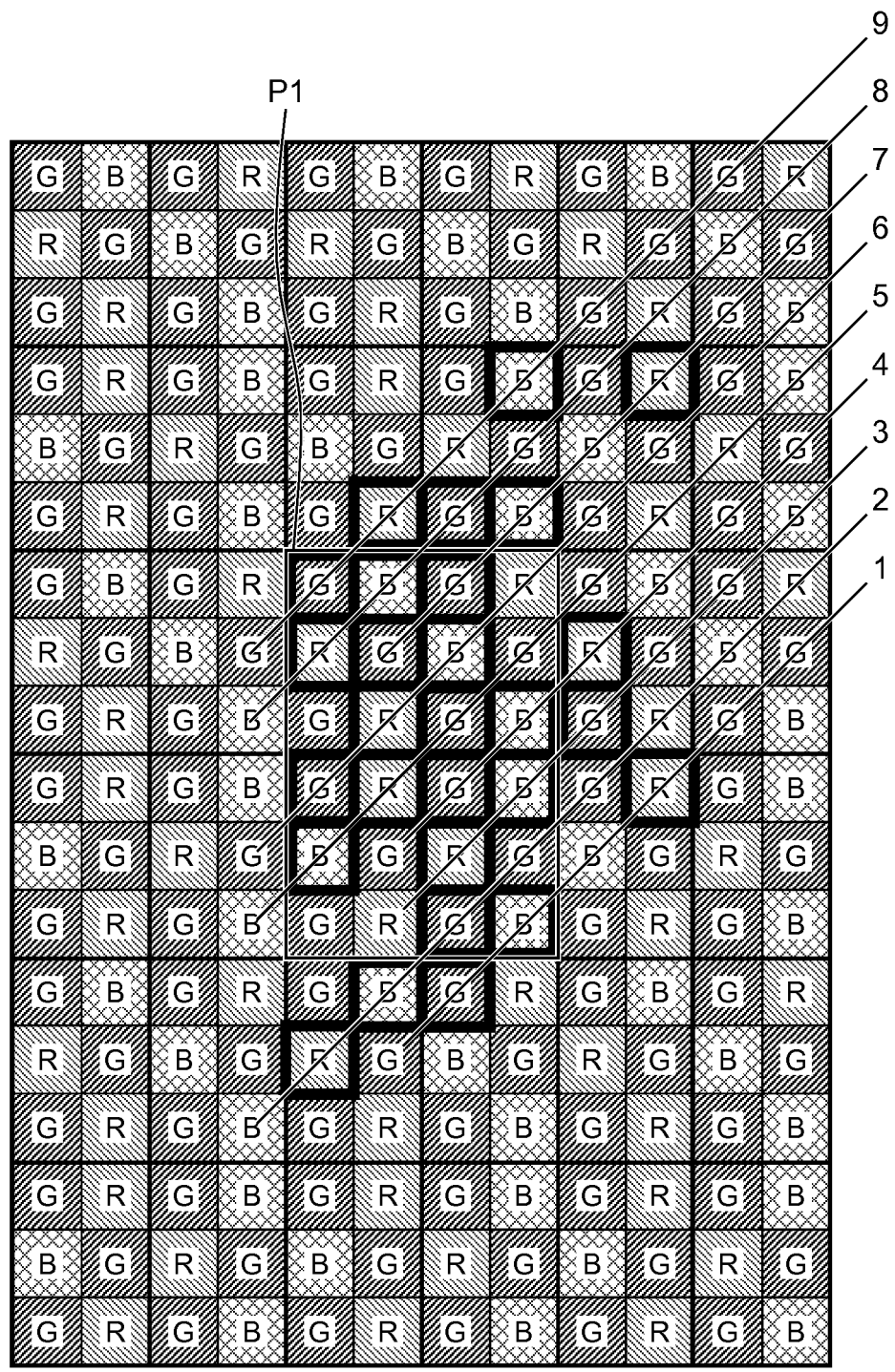
FIG. 3 is a diagram showing existence of color filters of R, G, and B in an upper right direction of the color imaging element of the first embodiment.

As shown in FIG. 1, the G filters are arranged in all lines in the horizontal and vertical directions in the basic array pattern P1. As shown in FIG. 2, the G filters are arranged in all lines 1 to 9 in the lower right direction passing through the basic array pattern P1. As shown in FIG. 3, the G filters are arranged in all lines 1 to 9 in the upper right direction passing through the basic array pattern P1.

This is an effect of arranging the G filters in the check pattern shape in the sub-arrays of N×M (N and M are integers, and at least one of them is an odd number).

The G filters corresponding to the luminance pixels are arranged in each line in the horizontal, vertical, upper right, and lower right directions of the color filter array. Therefore, the reproduction accuracy of the demosaicing process in a high frequency area can be improved regardless of the direction of the high frequency wave.

{Feature (3)}

The numbers of pixels of the R pixels, the G pixels, and the B pixels corresponding to the R, G, and B filters in the sub-arrays P1-1 and P1-2 of the color filter array shown in FIG. 1 are two pixels, three pixels, and one pixel, respectively. The numbers of pixels of the R pixels, the G pixels, and the B pixels corresponding to the R, G, and B filters in the sub-arrays P1-3 and P1-4 are one pixel, three pixels, and two pixels, respectively. Therefore, the numbers of pixels of the R pixels, the G pixels, and the B pixels corresponding to the R, G, and B filters in the basic array pattern P1 of the color filter array shown in FIG. 1 are six pixels, twelve pixels, and six pixels, respectively. Therefore, the ratio of the numbers of RGB pixels is 1:2:1, and the proportion of the number of G pixels that most contribute to obtaining the luminance signals is greater than the proportions of the numbers of R and B pixels of other colors.

In this way, the number of G filters can be substantially twice as much as the numbers of R and B filters by arranging the G filters in the check pattern shape in the sub-arrays P1-1, P1-2, P1-3, and P1-4.

The proportion of the number of G pixels and the proportions of the numbers of R and B pixels are different, and particularly, the proportion of the number of G pixels that most contribute to obtaining the luminance signals is greater than the proportions of the numbers of R and B pixels. Therefore, aliasing in the demosaicing processing can be suppressed, and high frequency reproducibility can be improved.

The number of R filters and the number of B filters are the same in the basic array pattern. The difference between the number of R filters and the number of B filters is one in the sub-arrays. The R filters and the B filters are irregularly arranged. This can suppress the generation of color moire (false color).

{Feature (4)}

In the color filter array shown in FIG. 1, one or more R and B filters corresponding to two or more colors other than the color of G (colors of R and B in the embodiment) are arranged in each line in the horizontal and vertical directions of the color filter array in the basic array pattern P1.

As shown in FIG. 1, the R filters and the B filters are arranged in all lines in the horizontal and vertical directions in the basic array pattern P1. As shown in FIG. 2, the R filters and the B filters are arranged in all of the lines 1 to 9 in the lower right direction passing through the basic array pattern P1. As shown in FIG. 3, the R filters and the B filters are arranged in all of the lines 1 to 9 in the upper right direction passing through the basic array pattern P1.

The R and B filters are arranged in each line in the horizontal and vertical directions of the color filter array. Therefore, the generation of color moire (false color) can be suppressed. As a result, it is possible not to arrange an optical low-pass filter for suppressing the generation of false color on an optical path from a plane of incident to an imaging plane of the optical system. Even if the optical low-pass filter is applied, a filter with less effect of cutting high frequency components for preventing the generation of false color can be applied, and a loss of resolution can be prevented.

{Feature (5)}

The color filter array shown in FIG. 1 is symmetric. More specifically, the sub-arrays P1-2 and P1-4 shown in FIG. 1 are line symmetric with respect to the line in the horizontal direction passing through the centers of the sub-arrays. The symmetry can reduce and simplify the circuit size of a processing circuit in a later stage.

Although the example of the basic array pattern with four pixels in the horizontal direction and six pixels in the vertical direction including the 2×3 sub-arrays with two pixels in the horizontal direction and three pixels in the vertical direction has been described in the embodiment, the sub-array may include two pixels in the vertical direction and three pixels in the horizontal direction. In this case, the basic array pattern includes four pixels in the vertical direction and six pixels in the horizontal direction.

Although there are a plurality of basic array patterns for each of the color filter arrays in the other embodiments described below, the representative one will be called a basic array pattern of the color filter array.

<Second Embodiment>

Figure 4:
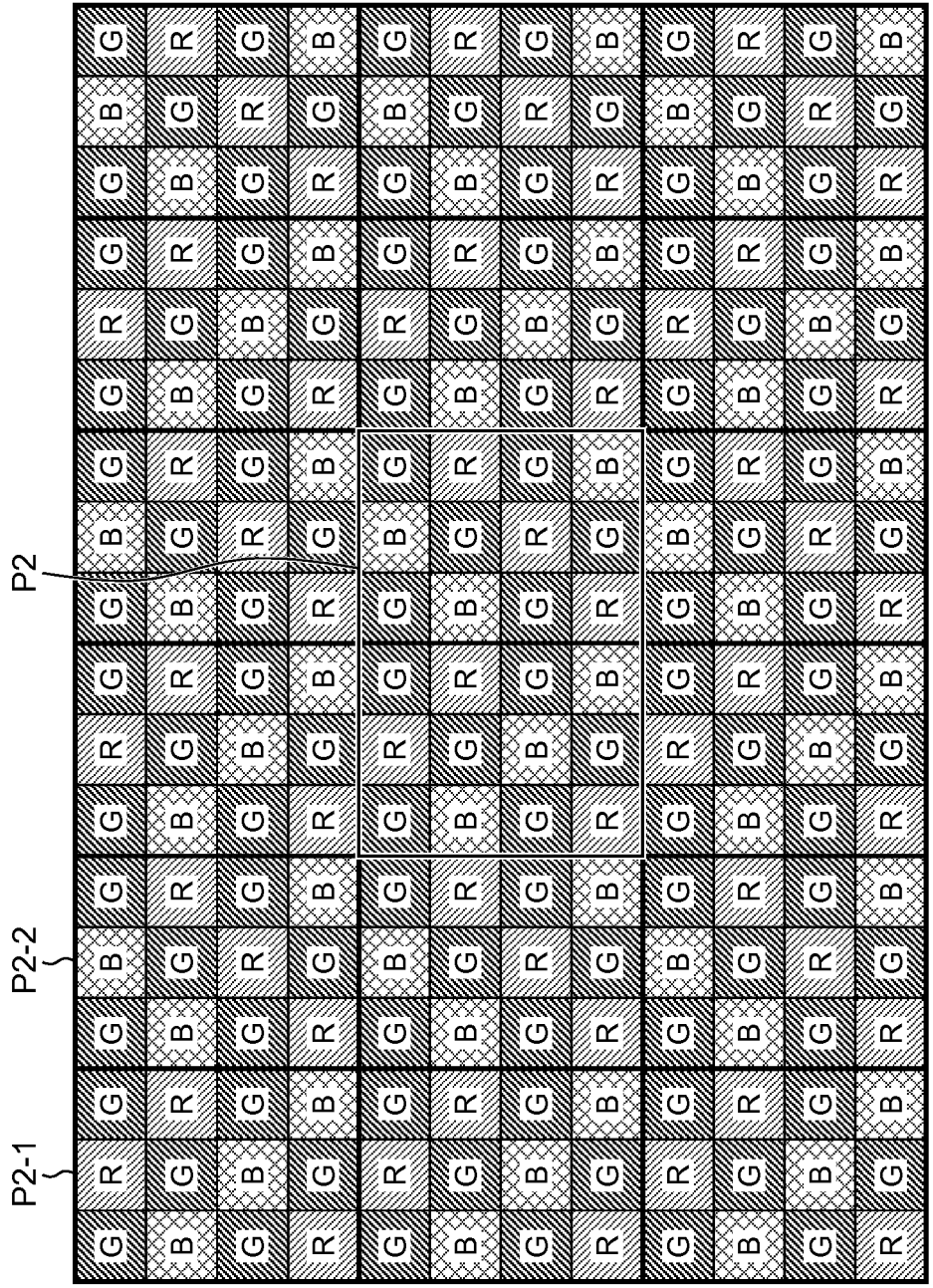
FIG. 4 is a diagram showing a second embodiment of the single-plate color imaging element according to the present invention.

FIG. 4 is a diagram showing a second embodiment of the single-plate color imaging element according to the present invention, and FIG. 4 particularly illustrates a color filter array of color filters arranged on the color imaging element.

The color filter array of the color imaging element of the second embodiment has the same features as the features (1), (2), (3), and (4) of the color filter array of the color imaging element of the first embodiment. The same features as the color filter array of the color imaging element of the first embodiment will not be described in detail.

{Feature (1)}

The color filter array shown in FIG. 4 includes a basic array pattern P2 (pattern indicated by a thick frame) of 6×4 pixels formed by sub-arrays P2-1 and P2-2 of 3×4 pixels, and the basic array pattern P2 is repeatedly arranged in the horizontal and vertical directions.

The sub-arrays P2-1 and P2-2 include four pixels in the vertical direction and three pixels in the horizontal direction, and the basic array pattern P2 includes four pixels in the vertical direction and six pixels in the horizontal direction. More specifically, the sub-array includes M×N pixels (M and N are integers, M≠N), and the basic array patter P2 is formed by arranging two sub-arrays so that the number of pixels is 2M×N.

The sub-arrays P2-1 and P2-2 include G filters as luminance pixels arranged in a check pattern shape. Although the sub-arrays P2-1 and P2-2 include G filters in the top row and the second row from the bottom of the left and right columns and include G filters in the second row from the top and the bottom row of the center column, the arrangement may be opposite.

In the sub-array P2-1, the R and B filters are arranged in the lower right direction. In the sub-array P2-2, the R and B filters are arranged in the upper right direction.

In the sub-arrays P2-1 and P2-2, the R filters, the G filters, and the B filters are arranged so as not to be adjacent to each other in up-and-down and left-and-right directions. In the basic array pattern P2, the R filters, the G filters, and the B filters are arranged so as not to be adjacent to each other in the up-and-down and left-and-right directions. Even in a state that the basic array pattern P2 is repeatedly arranged in the up-and-down and left-and-right directions, the R filters, the G filters, and the B filters are arranged so as not to be adjacent to each other in the up-and-down and left-and-right directions. However, the conditions are not essential.

The basic array pattern P2 includes the sub-array P2-1 arranged on the left side and the sub-array P2-2 arranged on the right of the sub-array P1-1. The arrangement of the sub-arrays in the basic array pattern P2 is not limited to this. The sub-array may be arranged in any way as long as the basic array pattern P2 includes 6×4 pixels.

Therefore, the color filter array includes the filters of R, G, and B colors (R filters, G filters, and B filters) arranged in a cycle.

{Feature (2)}

The color filter array shown in FIG. 4 includes the G filters corresponding to the color (color of G in this embodiment) that most contributes to obtaining the luminance signals arranged in each line in the horizontal, vertical, upper right, and lower right directions of the color filter array.

Figure 5:
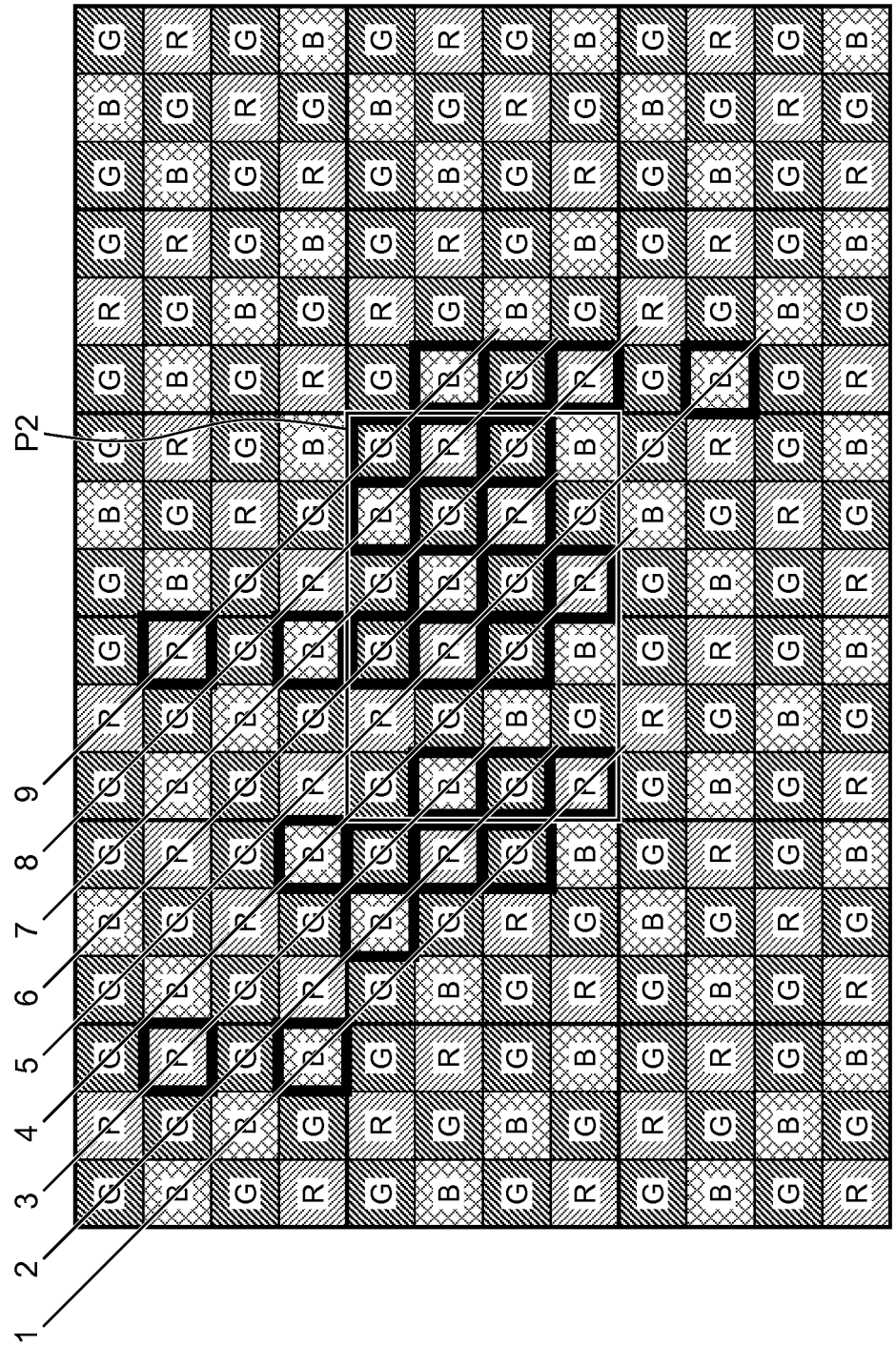
FIG. 5 is a diagram showing existence of color filters of R, G, and B in the lower right direction of the color imaging element of the second embodiment.
Figure 6:
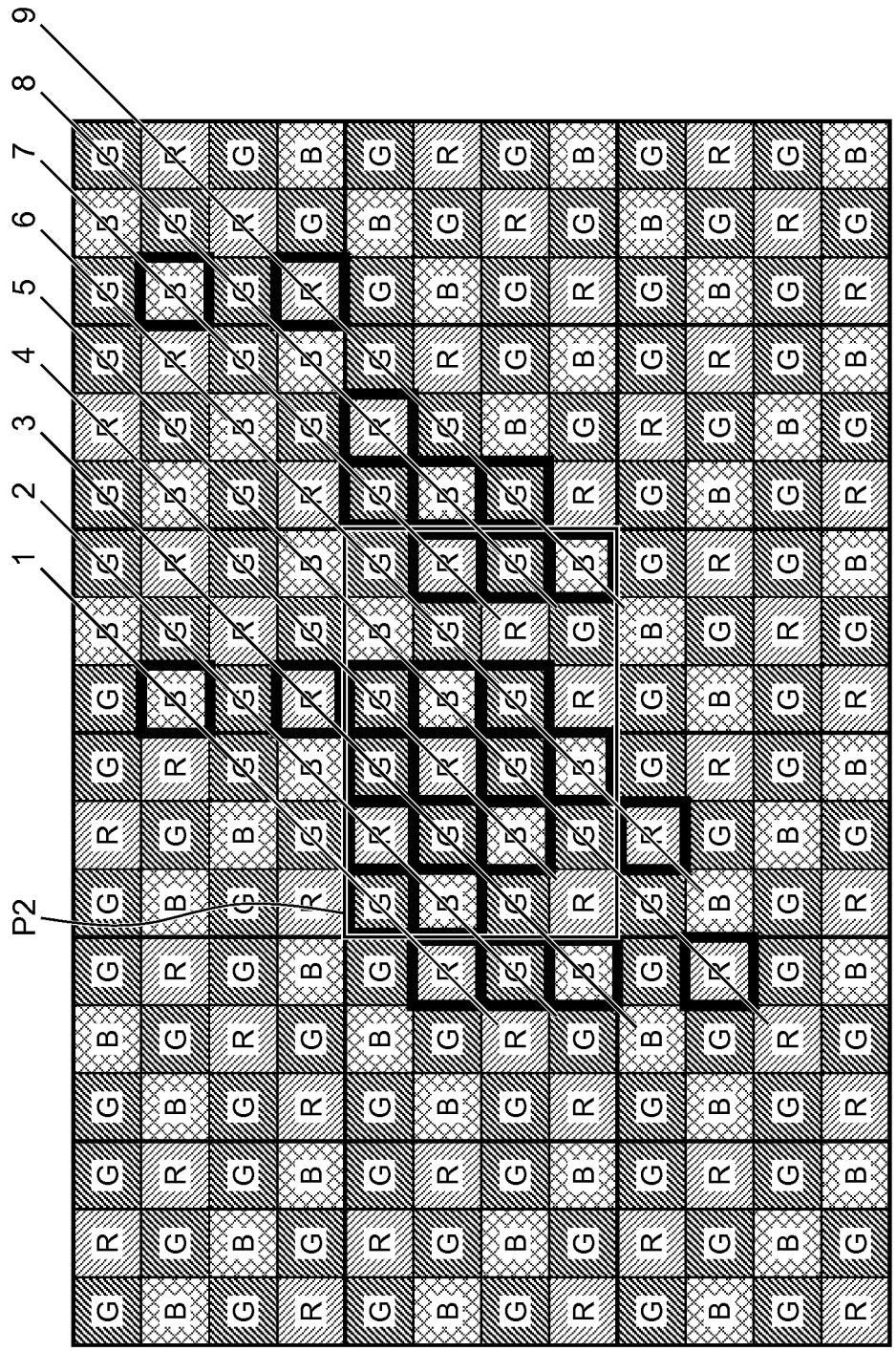
FIG. 6 is a diagram showing existence of color filters of R, G, and B in the upper right direction of the color imaging element of the second embodiment.

As shown in FIG. 4, the G filters are arranged in all lines in the horizontal and vertical directions in the basic array pattern P2. As shown in FIG. 5, the G filters are arranged in all lines 1 to 9 in the lower right direction passing through the basic array pattern P2. As shown in FIG. 6, the G filters are arranged in all lines 1 to 9 in the upper right direction passing through the basic array pattern P2.

{Feature (3)}

The numbers of pixels of the R pixels, the G pixels, and the B pixels corresponding to the R, G, and B filters in the sub-arrays P2-1 and P2-2 of the color filter array shown in FIG. 4 are three pixels, six pixels, and three pixels, respectively. Therefore, the numbers of pixels of the R pixels, the G pixels, and the B pixels corresponding to the R, G, and B filters in the basic array pattern P2 of the color filter array shown in FIG. 4 are six pixels, twelve pixels, and six pixels, respectively. Therefore, the ratio of the numbers of RGB pixels is 1:2:1, and the proportion of the number of G pixels that most contribute to obtaining the luminance signals is greater than the proportions of the numbers of R and B pixels of other colors.

{Feature (4)}

The color filter array shown in FIG. 4 includes one or more R and B filters corresponding to two or more colors other than the color of G (colors of R and B in this embodiment) arranged in each line in the horizontal and vertical directions of the color filter array in the basic array pattern P2.

As shown in FIG. 4, the R filters and the B filters are arranged in all lines in the horizontal and vertical directions in the basic array pattern P2. As shown in FIG. 5, the R filters and the B filters are arranged in all of the lines 1 to 9 in the lower right direction passing through the basic array pattern P2. As shown in FIG. 6, the R filters and the B filters are arranged in all of the lines 1 to 9 in the upper right direction passing through the basic array pattern P2.

Although the example of the basic array pattern of 6×4 pixels including the sub-arrays of 3×4 pixels including the R and B filters arranged in the lower right direction has been described in the embodiment, the basic array pattern of 6×4 pixels including the sub-arrays of 3×4 pixels satisfying the features (1) to (4) is not limited to this.

Although the example of the basic array pattern with four pixels in the vertical direction and six pixels in the horizontal direction including the 3×4 sub-arrays with four pixels in the vertical direction and three pixels in the horizontal direction has been described in the embodiment, the sub-array may include three pixels in the vertical direction and four pixels in the horizontal direction. In this case, the basic array pattern includes six pixels in the vertical direction and four pixels in the horizontal direction.

<Third Embodiment>

Figure 7:
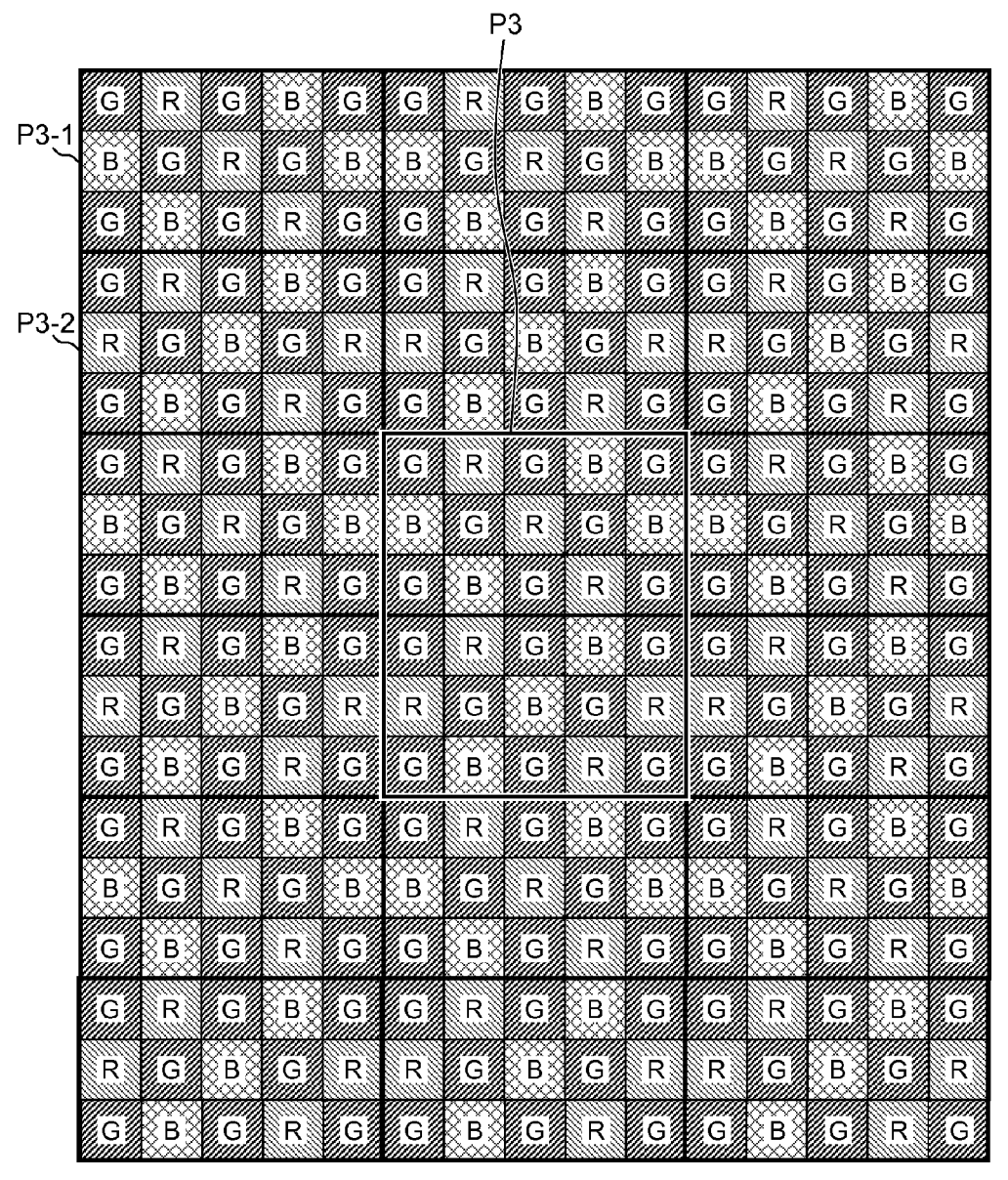

FIG. 7 is a diagram showing a third embodiment of the single-plate color imaging element according to the present invention, and FIG. 7 particularly illustrates a color filter array of color filters arranged on the color imaging element.

The color filter array of the color imaging element of the third embodiment has the same features as the features (1), (2), (3), (4), and (5) of the color filter array of the color imaging element of the first embodiment and has a feature (6) not included in the color filter array of the color imaging element of the first embodiment. The same features as the color filter array of the color imaging element of the first embodiment will not be described in detail.

{Feature (1)}

The color filter array shown in FIG. 7 includes a basic array pattern P3 (pattern indicated by a thick frame) of 6×5 pixels formed by sub-arrays P3-1 and P3-2 of 3×5 pixels, and the basic array pattern P3 is repeatedly arranged in the horizontal and vertical directions.

The sub-arrays P3-1 and P3-2 include three pixels in the vertical direction and five pixels in the horizontal direction, and the basic array pattern P3 includes six pixels in the vertical direction and five pixels in the horizontal direction. More specifically, the sub-array includes M×N pixels (M and N are integers, M≠N), and the basic array patter P3 is formed by arranging two sub-arrays so that the number of pixels is 2M×N.

The sub-arrays P3-1 and P3-2 include G filters as luminance pixels arranged in a check pattern shape. Although the sub-arrays P3-1 and P3-2 include G filters arranged in the top and bottom rows of the left, right, and center columns and include G filters arranged in the center row of the other columns, the arrangement may be opposite.

In the sub-array P3-1, the R and B filters are arranged in the lower right direction. In the sub-array P3-2, the R and B filters are arranged in the upper right direction.

In the sub-arrays P3-1 and P3-2, the R filters, the G filters, and the B filters are arranged so as not to be adjacent to each other in up-and-down and left-and-right directions. In the basic array pattern P3, the R filters, the G filters, and the B filters are arranged so as not to be adjacent to each other in the up-and-down and left-and-right directions. However, the conditions are not essential.

The basic array pattern P3 includes the sub-array P3-1 arranged on the upper side and the sub-array P3-2 arranged below the sub-array P3-1. The arrangement of the sub-arrays in the basic array pattern P3 is not limited to this. The sub-array may be arranged in any way as long as the basic array pattern P3 includes 6×5 pixels.

Therefore, the color filter array includes the filters of R, G, and B colors (R filters, G filters, and B filters) arranged in a cycle.

{Feature (2)}

The color filter array shown in FIG. 7 includes the G filters corresponding to the color (color of G in this embodiment) that most contributes to obtaining the luminance signals arranged in each line in the horizontal, vertical, upper right, and lower right directions of the color filter array.

Figure 8:
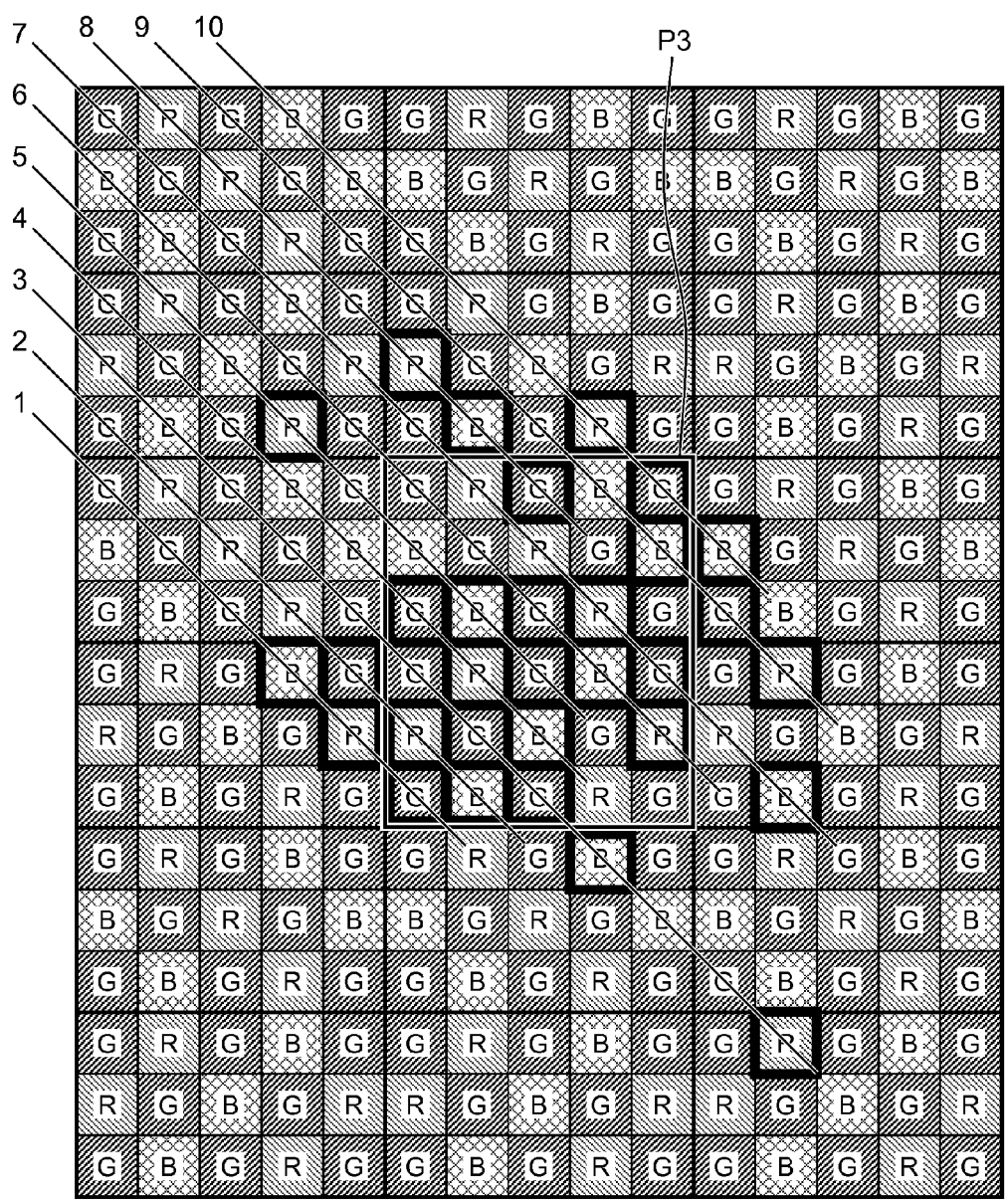
FIG. 8 is a diagram showing existence of color filters of R, G, and B in the lower right direction of the color imaging element of a third embodiment.
Figure 9:
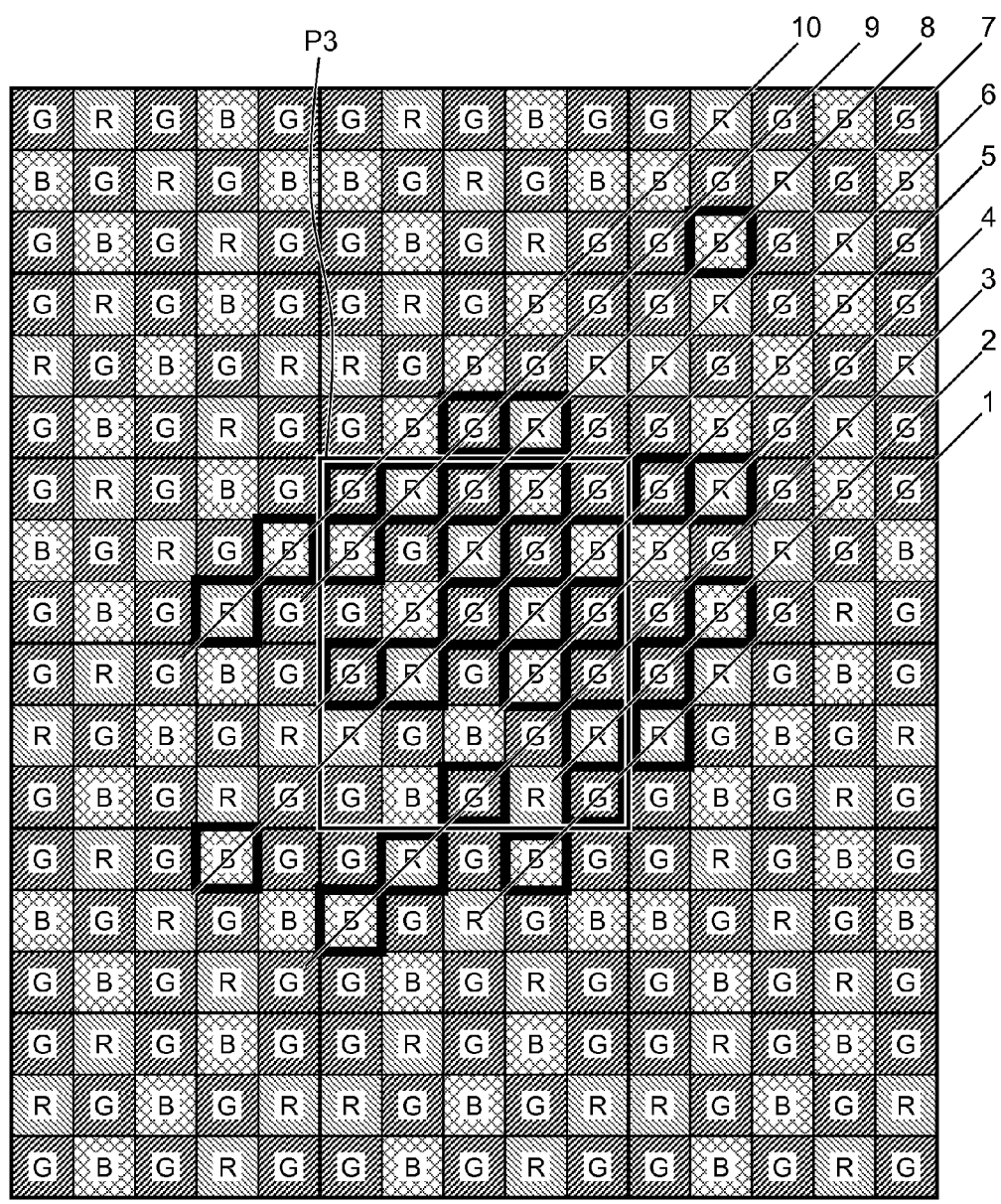
FIG. 9 is a diagram showing existence of color filters of R, G, and B in the upper right direction of the color imaging element of the third embodiment.

As shown in FIG. 7, the G filters are arranged in all lines in the horizontal and vertical directions in the basic array pattern P3. As shown in FIG. 8, the G filters are arranged in all lines 1 to 9 in the lower right direction passing through the basic array pattern P3. As shown in FIG. 9, the G filters are arranged in all lines 1 to 9 in the upper right direction passing through the basic array pattern P3.

{Feature (3)}

The numbers of pixels of the R pixels, the G pixels, and the B pixels corresponding to the R, G, and B filters in the sub-arrays P3-1 and P3-2 of the color filter array shown in FIG. 7 are three or four pixels, eight pixels, and three or four pixels, respectively. Therefore, the numbers of pixels of the R pixels, the G pixels, and the B pixels corresponding to the R, G, and B filters in the basic array pattern P3 of the color filter array shown in FIG. 7 are seven pixels, sixteen pixels, and seven pixels, respectively. The proportion of the number of G pixels that most contribute to obtaining the luminance signals is greater than the proportions of the numbers of R and B pixels of other colors.

Although the sub-array P3-1 includes three pixels of R filters and four pixels of B filters, and the sub-array P3-2 includes four pixels of R filters and three pixels of B filters, the arrangement may be opposite.

{Feature (4)}

The color filter array shown in FIG. 7 includes one or more R and B filters corresponding to two or more colors other than the color of G (colors of R and B in this embodiment) arranged in each line in the horizontal and vertical directions of the color filter array in the basic array pattern P3.

As shown in FIG. 7, the R filters and the B filters are arranged in all lines in the horizontal and vertical directions in the basic array pattern P3. As shown in FIG. 8, the R filters and the B filters are arranged in all of the lines 1 to 9 in the lower right direction passing through the basic array pattern P3. As shown in FIG. 9, the R filters and the B filters are arranged in all of the lines 1 to 9 in the upper right direction passing through the basic array pattern P3.

The R filters, the G filters, and the B filters are arranged so as not to be adjacent to each other in the up-and-down and left-and-right directions in the basic array pattern P3, and a basic array pattern satisfying the feature (4) can be easily created by arranging the color filters in this way.

{Feature (5)}

The color filter array shown in FIG. 7 is point-symmetric. The sub-arrays P3-1 and P3-2 of the color filter array shown in FIG. 7 are point-symmetric with respect to the center of the sub-array patterns (R or B filter at the center).

{Feature (6)}

The color filter array shown in FIG. 7 includes a square array corresponding to 2×2 pixels formed by G filters. The sub-arrays P3-1 and P3-2 include G filters arranged at four corners. Therefore, when two sub-arrays P3-1 and two sub-arrays P3-2 (four in total) are arranged in the horizontal and vertical directions or when the two basic array patterns P3 are arranged in the left-and-right direction, a square array corresponding to 2×2 pixels formed by G filters appears at the center section.

Figure 10:
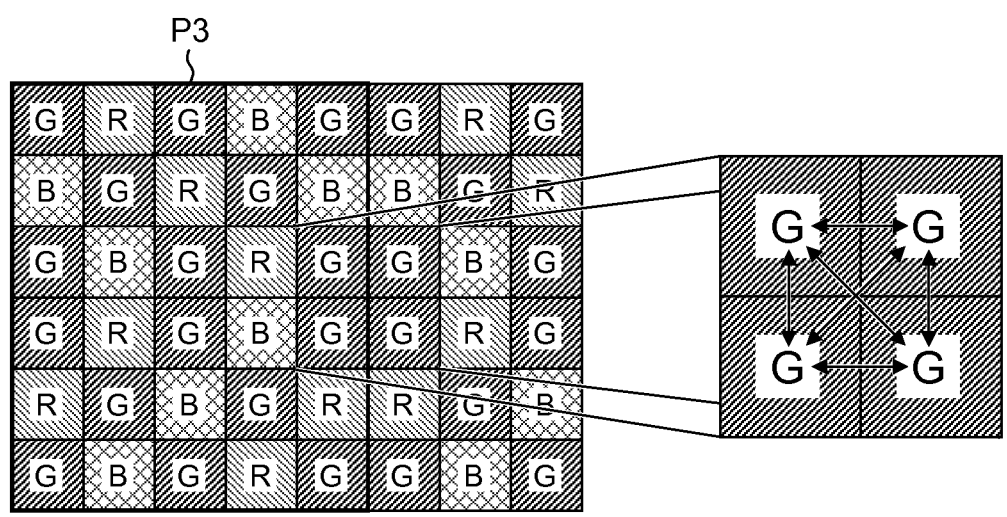
FIG. 10 is a diagram used to explain a method of determining a correlation direction from pixel values of G pixels of 2×2 pixels included in a color filter array of the color imaging element of the third embodiment.

As shown in FIG. 10, 2×2 pixels of G filters are extracted to calculate difference absolute values of the pixel values of the G pixels in the horizontal direction, difference absolute values of the pixel values of the G pixels in the vertical direction, and difference absolute values of the pixel values of the G pixels in the oblique directions (upper right oblique and upper left oblique directions). In this way, it can be determined that there is a correlation in the direction with a small difference absolute value among the horizontal, vertical, and oblique directions.

Therefore, according to the color filter array, information of the G pixels at minimum pixel intervals can be used to determine the direction with a high correlation among the horizontal, vertical, and oblique directions. The direction determination result can be used for a process of interpolation (demosaicing processing) based on surrounding pixels.

Although the example of the basic array pattern with six pixels in the vertical direction and five pixels in the horizontal direction including the 3×5 sub-arrays with three pixels in the vertical direction and five pixels in the horizontal direction has been described in the embodiment, the sub-array may include five pixels in the vertical direction and three pixels in the horizontal direction. In this case, the basic array pattern includes five pixels in the vertical direction and three pixels in the horizontal direction.

The first to third embodiments illustrate examples of the basic array patterns, in which the sub-arrays of N×M (N and M are integers, at least one of them is an odd number, and M≠N) satisfying at least the features (1) to (4) are repeatedly arranged in the horizontal and vertical directions, and the arrangement is not limited to these. The numbers of pixels may be M in the horizontal direction and N in the vertical direction, or the numbers of pixels may be N in the horizontal direction and M in the vertical direction. However, if M is 4 or more, the necessity of using the sub-arrays is reduced, and the number of pixels in the basic array pattern increases. Therefore, it is preferable that the M is 3 or less.

<Fourth Embodiment>

Figure 11:
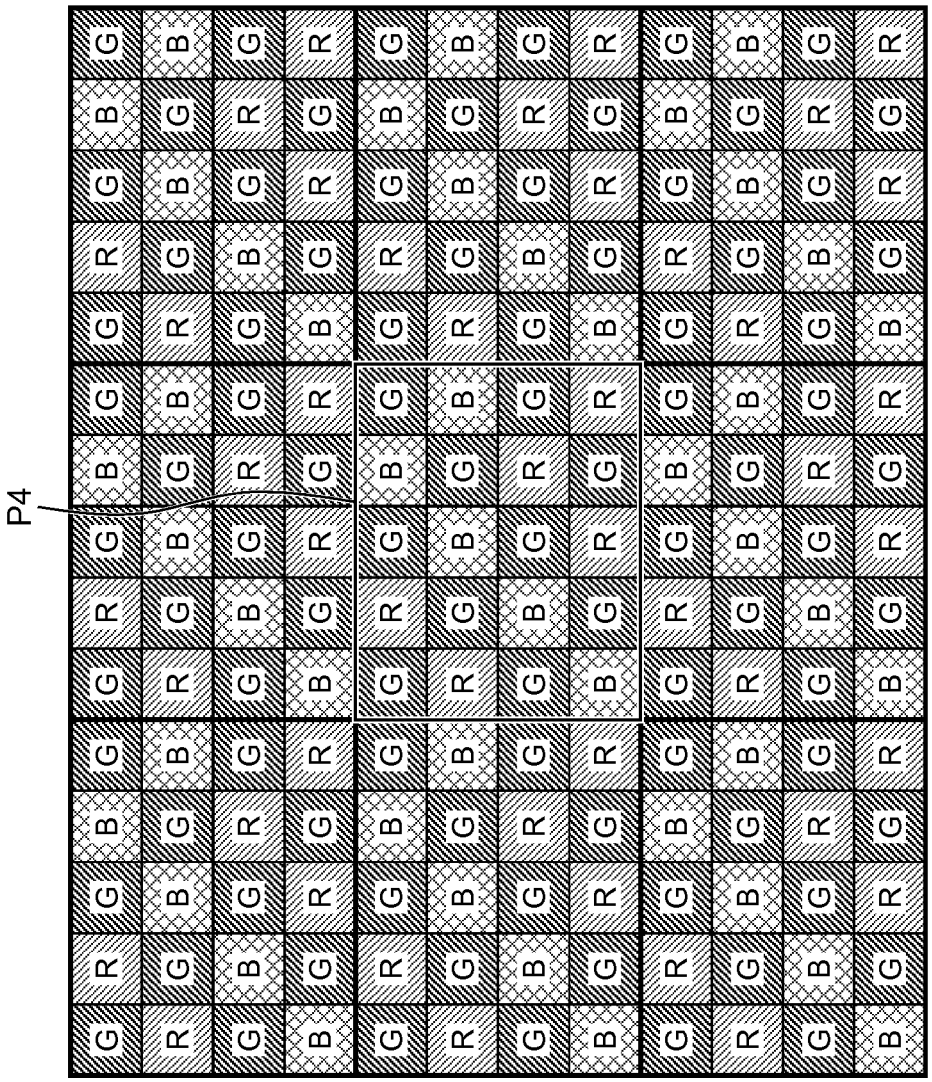
FIG. 11 is a diagram showing a fourth embodiment of the single-plate color imaging element according to the present invention.

FIG. 11 is a diagram showing a fourth embodiment of the single-plate color imaging element according to the present invention, and FIG. 11 particularly illustrates a color filter array of color filters arranged on the color imaging element.

The color filter array of the color imaging element of the fourth embodiment has the same features as the features (1), (2), (3), and (4) of the color filter array of the color imaging element of the first embodiment. The same features as the color filter array of the color imaging element of the first embodiment will not be described in detail.

{Feature (1)}

The color filter array shown in FIG. 11 includes a basic array pattern P4 (pattern indicated by a thick frame) formed by a square array pattern corresponding to 4×5 pixels, and the basic array pattern P4 is repeatedly arranged in the horizontal and vertical directions. Although the basic array pattern P4 includes four pixels in the vertical direction and five pixels in the horizontal direction, the opposite is also possible.

The basic array pattern P4 includes G filters as luminance pixels arranged in a check pattern shape. The check pattern can also be called a checker pattern. Although the basic array pattern P4 includes G filters arranged in the top and the second from the bottom of the columns on both sides and the center and includes one G filter arranged in the second from the top and the bottom in the other two columns, the arrangement may be opposite.

Therefore, the color filter array includes the filters of R, G, and B colors (R filters, G filters, and B filters) arranged in a cycle.

{Feature (2)}

The color filter array shown in FIG. 11 includes the G filters corresponding to the color (color of G in this embodiment) that most contributes to obtaining the luminance signals arranged in each line in the horizontal, vertical, upper right, and lower right directions of the color filter array.

Figure 12:
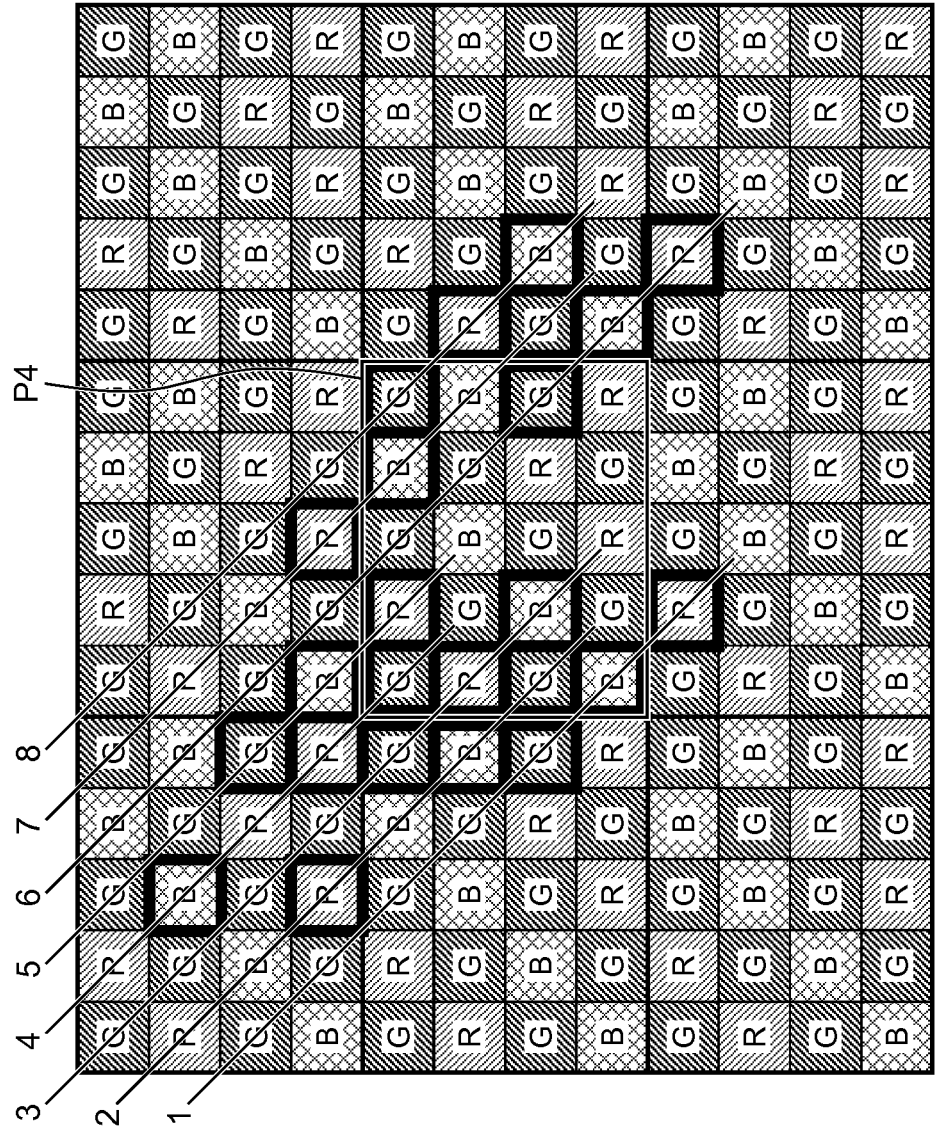
FIG. 12 is a diagram showing existence of color filters of R, G, and B in the lower right direction of the color imaging element of a fourth embodiment.
Figure 13:
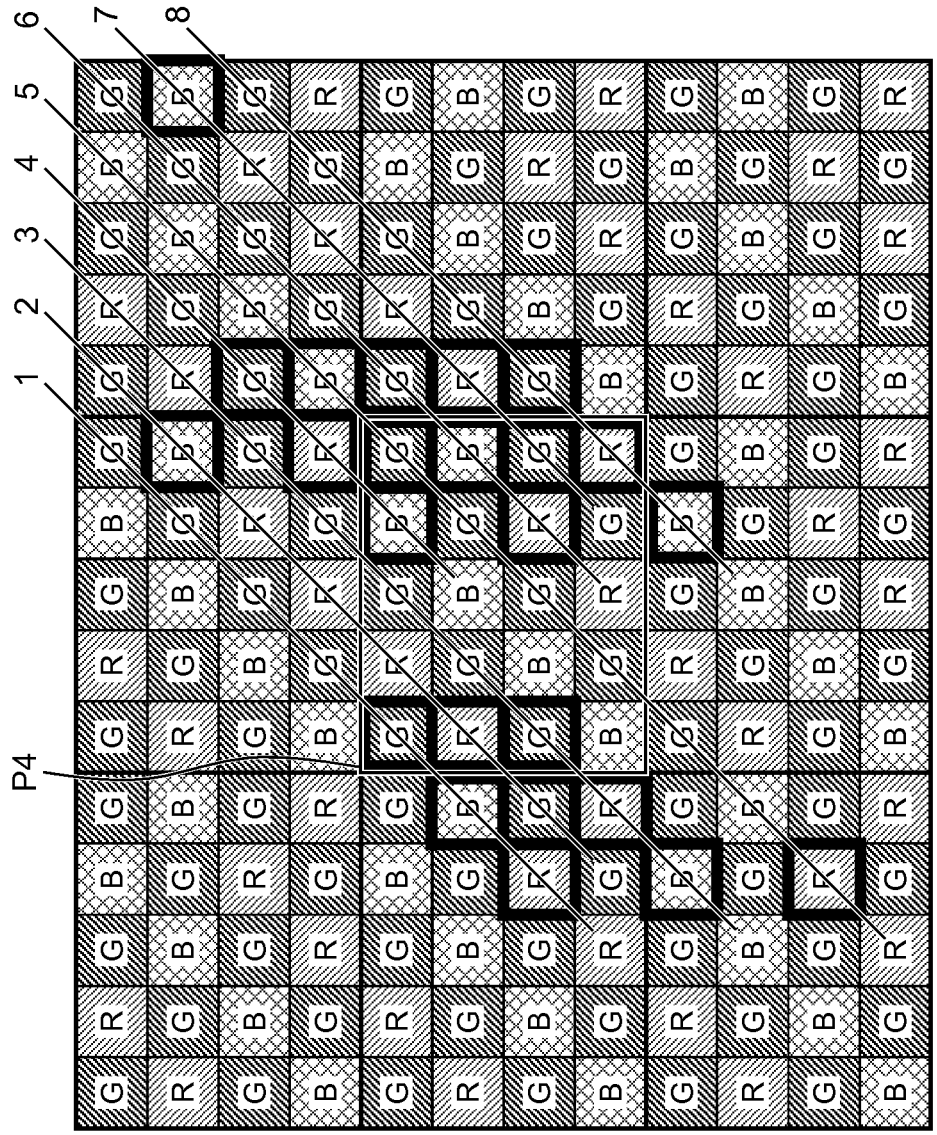
FIG. 13 is a diagram showing existence of color filters of R, G, and B in the lower right direction of the color imaging element of the fourth embodiment.

As shown in FIG. 11, the G filters are arranged in all lines in the horizontal and vertical directions in the basic array pattern P4. As shown in FIG. 12, the G filters are arranged in all lines 1 to 8 in the lower right direction passing through the basic array pattern P4. As shown in FIG. 13, the G filters are arranged in all lines 1 to 8 in the upper right direction passing through the basic array pattern P4.

This is an effect of arranging the G filters in the check pattern shape in the basic array pattern of N×M pixels (M and N are integers, M≠N).

{Feature (3)}

In the basic array pattern P4 of the color filter array shown in FIG. 11, the numbers of pixels of the R pixels, the G pixels, and the B pixels corresponding to the R, G, and B filters in the basic array pattern are 5 pixels, 10 pixels, and 5 pixels, respectively. Therefore, the ratio of the numbers of pixels of the RGB pixels is 1:2:1, and the proportion of the number of G pixels that most contribute to obtaining the luminance signals is greater than the proportions of the numbers of R and B pixels of other colors.

In this way, the number of G filters can be substantially twice as much as the numbers of R and B filters by arranging the G filters in the check pattern shape in the basic array pattern P4.

The number of R filters and the number of B filters are the same in the basic array pattern, and the R and B filters are irregularly arranged. This can suppress the generation of color moire (false color).

{Feature (4)}

The color filter array shown in FIG. 11 includes one or more R and B filters corresponding to two or more colors other than the color of G (colors of R and B in this embodiment) arranged in each line in the horizontal and vertical directions of the color filter array in the basic array pattern P4.

As shown in FIG. 11, the R filters and the B filters are arranged in all lines in the horizontal and vertical directions in the basic array pattern P4. As shown in FIG. 12, the R filters and the B filters are arranged in all of the lines 1 to 8 in the lower right direction passing through the basic array pattern P4. As shown in FIG. 13, the R filters and the B filters are arranged in all of the lines 1 to 8 in the upper right direction passing through the basic array pattern P4.

The R filters, the G filters, and the B filters are arranged so as not to be adjacent to each other in the up-and-down and left-and-right directions in the basic array pattern P4, and a basic array pattern satisfying the feature (4) can be easily created by arranging the color filters in this way.

<Fifth Embodiment>

Figure 14:
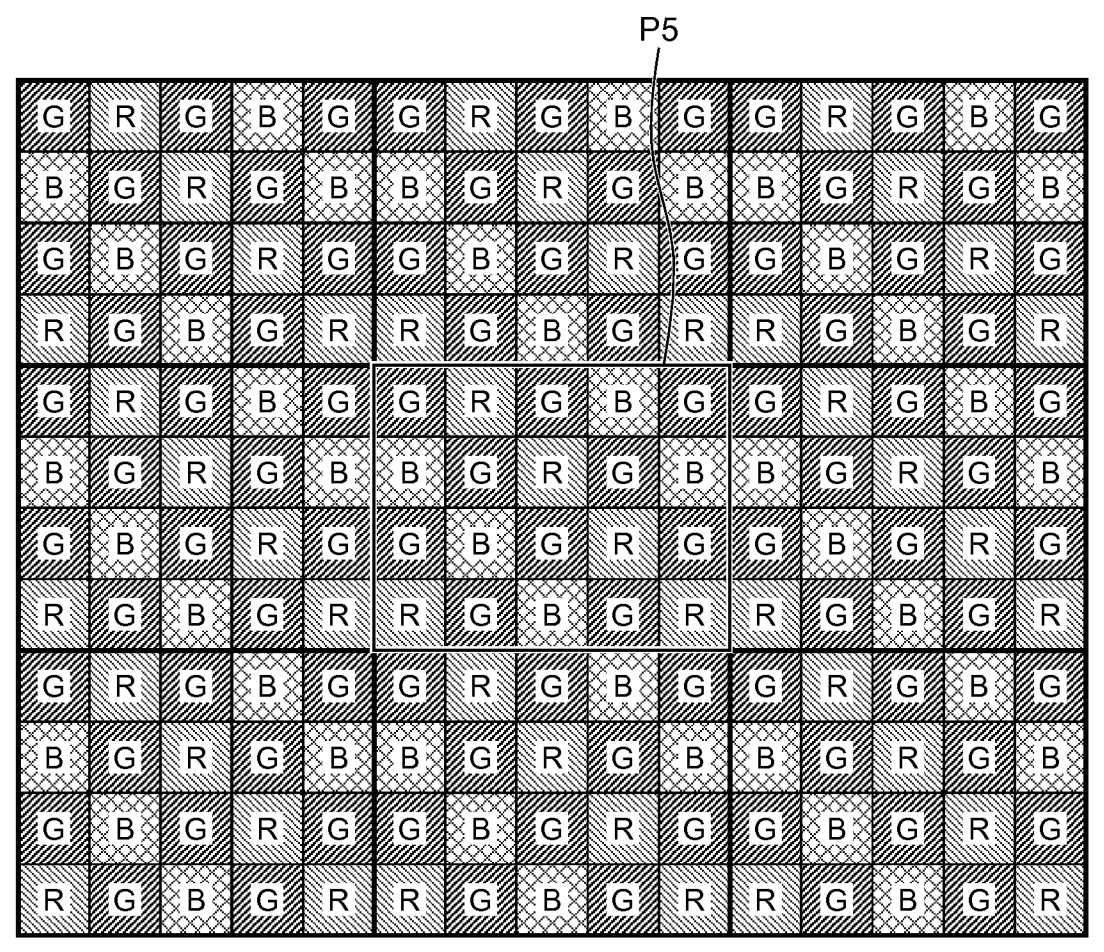

FIG. 14 is a diagram showing a fifth embodiment of the single-plate color imaging element according to the present invention, and FIG. 14 particularly illustrates a color filter array of color filters arranged on the color imaging element.

The color filter array of the color imaging element of the fifth embodiment has the same features as the features (1), (2), (3), and (4) of the color filter array of the color imaging element of the first embodiment. The same features as the color filter array of the color imaging element of the first to fourth embodiments will not be described in detail.

{Feature (1)}

The color filter array shown in FIG. 14 includes a basic array pattern P5 (pattern indicated by a thick frame) formed by a square array pattern corresponding to 4×5 pixels, and the basic array pattern P5 is repeatedly arranged in the horizontal and vertical directions. Although the basic array pattern P5 includes four pixels in the vertical direction and five pixels in the horizontal direction, the opposite is also possible.

The basic array pattern P5 includes G filters as luminance pixels arranged in a check pattern shape. The check pattern can also be called a checker pattern. Although the basic array pattern P5 includes G filters arranged in the top and the second from the bottom of the columns on both sides and the center and includes one G filter arranged in the second from the top and the bottom in the other two columns, the arrangement may be opposite.

In the basic array pattern P5, the R and B filters are arranged in the lower right direction. The method of arranging the R and B filters in the oblique direction is not limited to this. The arrangement of the R and B filters may be opposite, and the R and B filters may be arranged in the upper right direction.

Therefore, the color filter array includes the filters of R, G, and B colors (R filters, G filters, and B filters) arranged in a cycle.

{Feature (2)}

The color filter array shown in FIG. 14 includes the G filters corresponding to the color (color of G in this embodiment) that most contributes to obtaining the luminance signals arranged in each line in the horizontal, vertical, lower right, and upper right directions of the color filter array.

Figure 15:
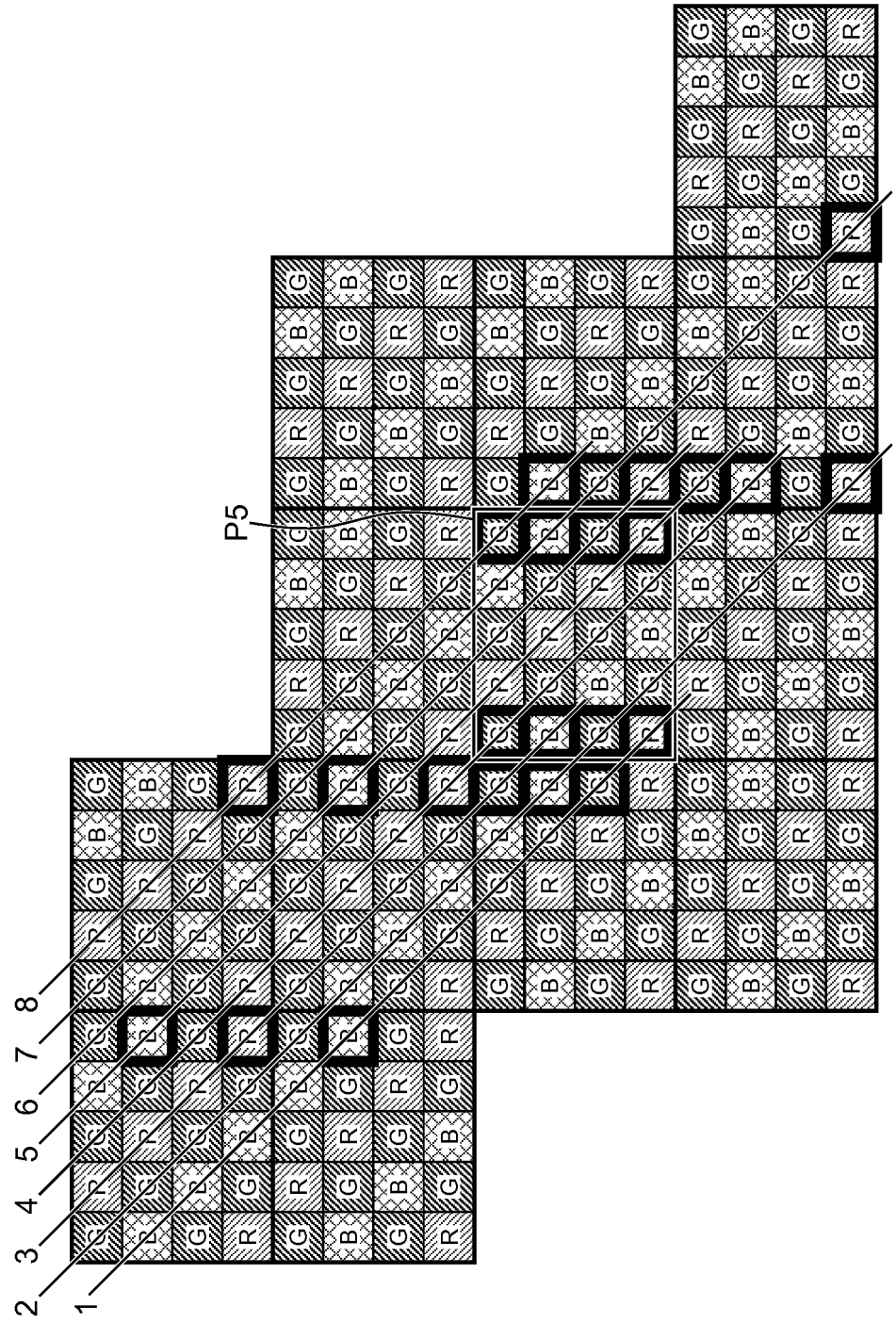
FIG. 15 is a diagram showing existence of color filters of R, G, and B in the lower right direction of the color imaging element of the fifth embodiment.
Figure 16:
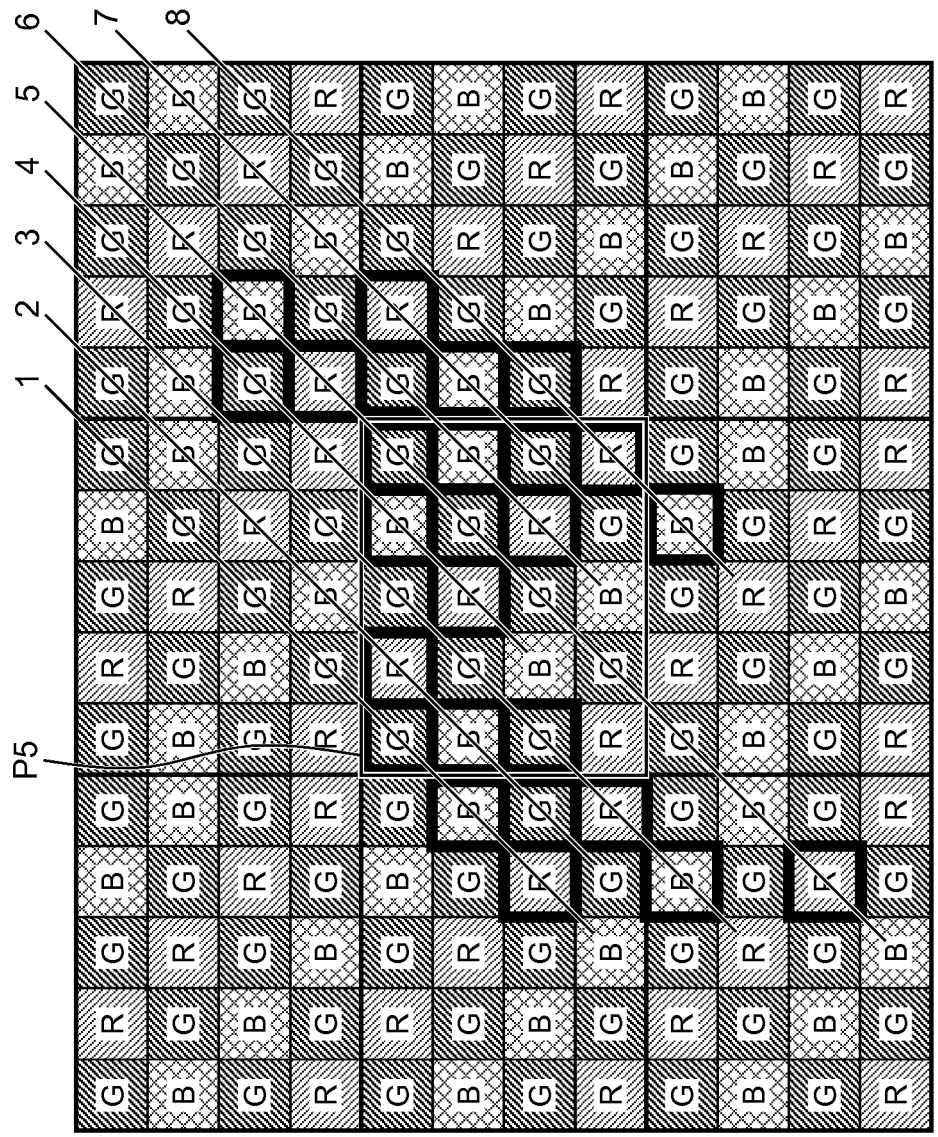
FIG. 16 is a diagram showing existence of color filters of R, G, and B in the lower right direction of the color imaging element of the fifth embodiment.

As shown in FIG. 14, the G filters are arranged in all lines in the horizontal and vertical directions in the basic array pattern P5. As shown in FIG. 15, the G filters are arranged in all lines 1 to 8 in the lower right direction passing through the basic array pattern P5. As shown in FIG. 16, the G filters are arranged in all lines 1 to 8 in the upper right direction passing through the basic array pattern P5.

{Feature (3)}

In the basic array pattern P5 of the color filter array shown in FIG. 14, the numbers of pixels of the R pixels, the G pixels, and the B pixels corresponding to the R, G, and B filters in the basic array pattern are 5 pixels, 10 pixels, and 5 pixels, respectively. Therefore, the ratio of the numbers of pixels of the RGB pixels is 1:2:1, and the proportion of the number of G pixels that most contribute to obtaining the luminance signals is greater than the proportions of the numbers of R and B pixels of other colors.

{Feature (4)}

The color filter array shown in FIG. 14 includes one or more R and B filters corresponding to two or more colors other than the color of G (colors of R and B in this embodiment) arranged in each line in the horizontal and vertical directions of the color filter array in the basic array pattern P5.

As shown in FIG. 14, the R filters and the B filters are arranged in all lines in the horizontal and vertical directions in the basic array pattern P5. As shown in FIG. 15, the R filters and the B filters are arranged in all of the lines 1 to 8 in the lower right direction passing through the basic array pattern P5. As shown in FIG. 16, the R filters and the B filters are arranged in all of the lines 1 to 8 in the upper right direction passing through the basic array pattern P5.

The R filters, the G filters, and the B filters are arranged so as not to be adjacent to each other in the up-and-down and left-and-right directions in the basic array pattern P5, and a basic array pattern satisfying the feature (4) can be easily created by arranging the color filters in this way.

The fourth and fifth embodiments illustrate examples of the basic array patterns of N×M (M and N are integers, at least one of them is an odd number, and M≠N) satisfying the features (1) to (4), and the arrangement is not limited to this. However, since the feature (4) is not satisfied if M is 3 or less, it is preferable that M is 4 or more.

The basic array pattern of N×M (M and N are integers, at least one of them is an odd number, and M≠N) satisfying at least the features (1) to (4) is not limited to 4×5 pixels. Basic array patterns with various numbers of pixels, such as 5×6 pixels, 5×8 pixels, 7×6 pixels, and 7×8 pixels, are possible as long as the G filters are arranged in a check pattern shape. However, in consideration of the ease of image processing, such as demosaicing process and thinning-out process in video imaging, it is desirable that N is 10 or less.

[Modified Example]

Although the example of adopting green (G) as a first color and adopting red (R) and blue (B) as second colors has been described in the embodiments, the colors that can be used in the color filters are not limited to these colors, and color filters corresponding to colors satisfying the following conditions can also be used.

<Conditions of First Filter (First Color)>

Although the example that the G filters of G color serve as the first filters in the first color of the present invention has been described in the embodiments, filters satisfying one of the following conditions (1) to (4) may be used in place of the G filters or in place of part of the G filters.

{Condition (1)}

The condition (1) is that the contribution ratio for obtaining the luminance signals is equal to or greater than 50%. The contribution ratio 50% is a value that is set to make a distinction between the first color (such as G color) and the second color (such as R and B colors) of the present invention and is a value that is set so that a color with the contribution ratio for obtaining the luminance data higher than that of the R color, B color, and the like is included in the "first color".

A color with the contribution ratio lower than 50% is a second color (such as R and B colors) of the present invention, and a filter in this color is the second filter of the present invention.

{Condition (2)}

The condition (2) is that the peak of the transmittance of the filter is in a range of wavelength 480 nm or more and 570 nm or less. A value measured by, for example, a spectrophotometer is used as the transmittance of the filter. The wavelength range is a range that is set to make a distinction between the first color (such as G color) and the second color (such as R and B colors) of the present invention and is a range that is set so that the peak of the R color, the B color, or the like with a relatively low contribution ratio is not included and the peak of the G color or the like with a relatively high contribution ratio is included. Therefore, a filter with the peak of the transmittance in the range of wavelength 480 nm or more and 570 or less can be used as a first filter. A filter with the peak of the transmittance out of the range of wavelength 480 nm or more and 570 or less is a second filter (R filter, B filter) of the present invention.

{Condition (3)}

The condition (3) is that the transmittance in a range of wavelength 500 nm or more and 560 or less is higher than the transmittance of the second filter (R filter or B filter). A value measured by, for example, a spectrophotometer is also used as the transmittance of the filter in the condition (3). The wavelength range of the condition (3) is also a range that is set to make a distinction between the first color (such as G color) and the second color (such as R and B colors) of the present invention and is a range that the transmittance of the filter in a color with the contribution ratio relatively higher than the R color, the B color, and the like is higher than the transmittance of the RB filters and the like. Therefore, a filter with a relatively high transmittance in the range of wavelength 500 nm or more and 560 nm or less can be used as a first filter, and a filter with a relatively low transmittance can be used as a second filter.

{Condition (4)}

The condition (4) is that filters of two or more colors including a color that most contributes to the luminance signals among the three primary colors (for example, G color of RGB) and including a color different from the three primary colors are used as first filters. In this case, a filter corresponding to a color other than the colors of the first filters is a second filter.

<A Plurality of Types of First Filters (G Filters)>

Therefore, the G filters of G color as the first filters are not limited to one type, and for example, a plurality of types of G filters (G1 filters, G2 filters) can be used as the first filters. More specifically, the G filters of the color filters (basic array pattern) according to the embodiments may be appropriately replaced by the G1 filters or the G2 filters. The G1 filters transmit G light of a first wavelength band, and the G2 filters transmit G light of a second wavelength band highly correlated with the G1 filters (see FIG. 17).

Existing G filters (for example, the G filters of the first embodiment) can be used as the G1 filters. Filters highly correlated with the G1 filters can be used as the G2 filters. In this case, it is desirable that the peak value of the spectral sensitivity curve of the light receiving elements provided with the G2 filters is, for example, in a range of wavelength 500 nm to 535 nm (near the peak value of the spectral sensitivity curve of the light receiving elements provided with the existing G filters). A method described for example in Japanese Patent Application Laid-Open No. 2003-284084 is used as a method of determining the color filters of four colors (R, G1, G2, B).

In this way, the color imaging element acquires four types of colors in the image, and color information to be acquired is increased. As a result, colors can be more accurately expressed compared to when only three types of colors (RGB) are acquired. More specifically, visually different colors can be reproduced as different colors, and visually same colors can be reproduced as same colors ("color determination" can be improved).

Since the transmittance of the G1 and G2 filters is basically the same as the transmittance of the G filters of the first embodiment, the contribution ratio for obtaining the luminance signals is higher than 50%. Therefore, the G1 and G2 filters satisfy the condition (1).

Figure 17:
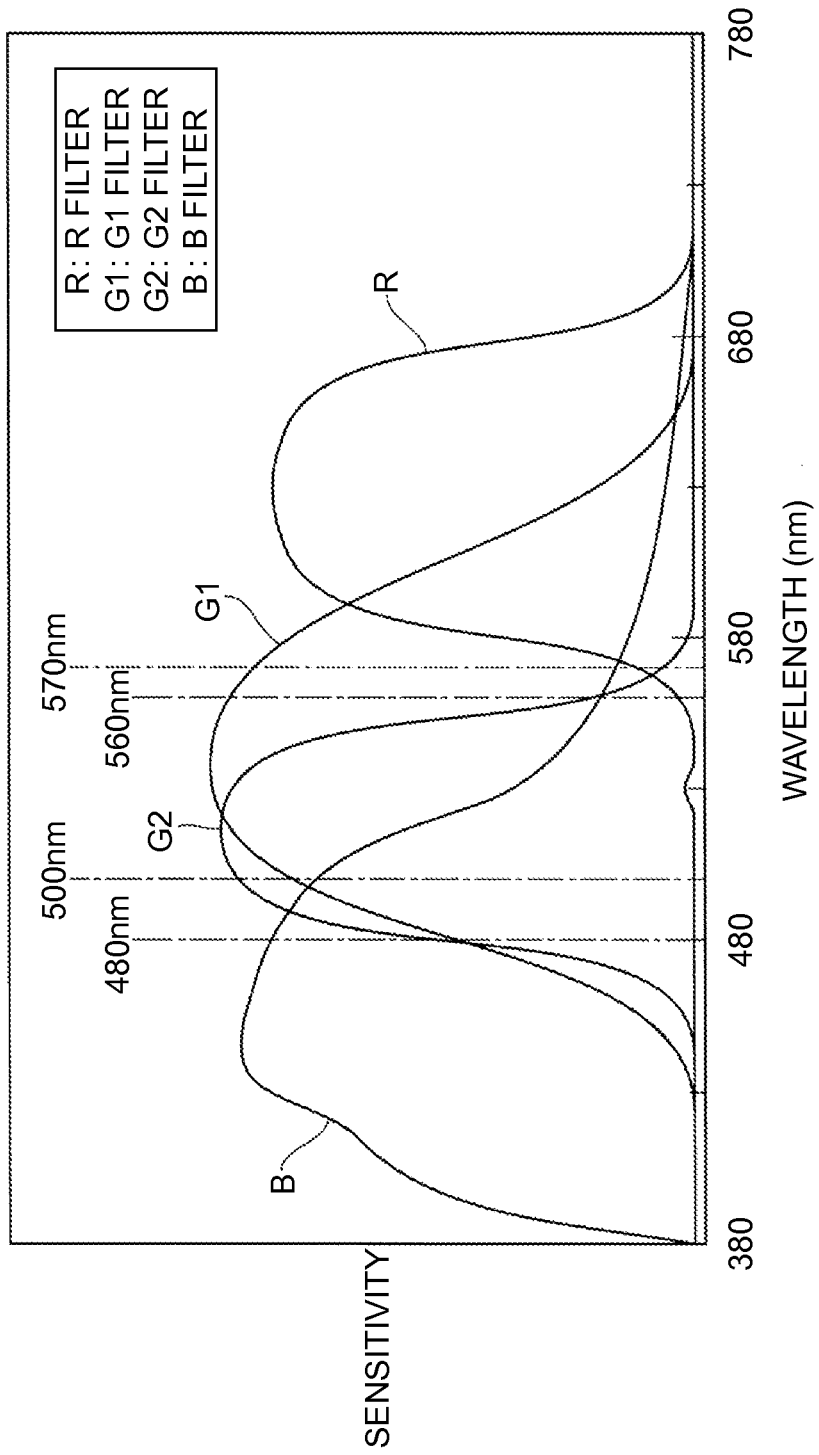
FIG. 17 is a graph showing spectral sensitivity characteristics of a light receiving element provided with an R filter (red filter), a G1 filter (first green filter), a G2 filter (a second green filter), and a B filter (blue filter).

In FIG. 17 showing the spectral sensitivity characteristics of the color filter array (light receiving elements), the peak of the transmittance of the G1 and G2 filters (peak of the sensitivity of the G pixels) is in the range of wavelength 480 nm or more and 570 nm or less. The transmittance of the G1 and G2 filters is in the range of wavelength 500 nm or more and 560 nm or less and is higher than the transmittance of the RB filters. Therefore, the G1 and G2 filters also satisfy the conditions (2) and (3).

The arrangement and the number of G1 and G2 filters may be appropriately changed. The types of the G filters may be increased to three or more types.

<Transparent Filters (W Filters)>

Although the embodiments mainly illustrate color filters made of color filters corresponding to RGB colors, part of the color filters may be transparent filters W (white pixels). Particularly, it is preferable to arrange the transparent filters W in place of part of the first filters (G filters). The replacement of part of the G pixels with the white pixels can suppress the degradation in the color reproducibility even if the pixel size is miniaturized.

The transparent filters W are filters of a transparent color (first color). The transparent filters W are filters that can transmit light corresponding to a wavelength band of visible light, and for example, whose transmittance of light of the RGB colors is 50% or more. Since the transmittance of the transparent filters W is higher than that of the G filters, the contribution ratio for obtaining the luminance signals is also higher than that of the G color (60%), and the condition (1) is satisfied.

Figure 18:
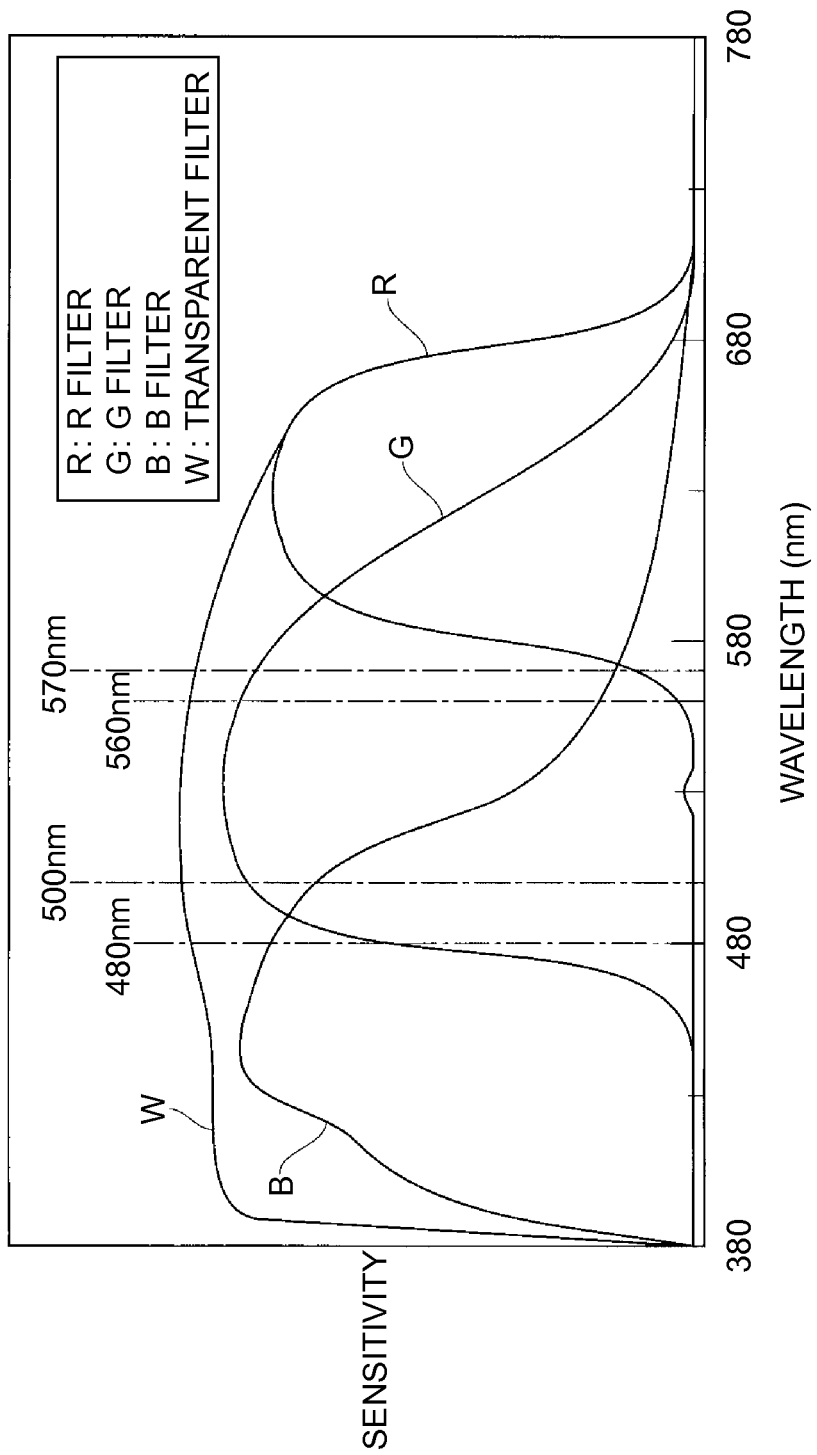
FIG. 18 is a graph showing spectral sensitivity characteristics of a light receiving element provided with an R filter, a G filter, a B filter, and a W filter (transparent filter).

In FIG. 18 showing the spectral sensitivity characteristics of the color filter array (light receiving elements), the peak of the transmittance of the transparent filters W (peak of the sensitivity of the white pixels) is in the range of wavelength 480 nm or more and 570 nm or less. The transmittance of the transparent filters W is higher than the transmittance of the RB filters in the range of wavelength 500 nm or more and 560 nm or less. Therefore, the transparent filters W also satisfy the conditions (2) and (3). As with the transparent filters W, the G filters also satisfy the conditions (1) to (3).

In this way, the transparent filters W satisfy the conditions (1) to (3), and the transparent filters W can be used as the first filters of the present invention. In the color filter array, since part of the G filters corresponding to the G color that most contributes to the luminance signals among the three primary colors of RGB are replaced by the transparent filters W, the condition (4) is also satisfied.

<Emerald Filters (E Filters)>

Although the embodiments mainly illustrate color filters made of color filters corresponding to RGB colors, part of the color filters may be filters of another color, such as filters E corresponding to an emerald (E) color (emerald pixels). Particularly, the emerald filters (E filters) may be arranged in place of part of the first filters (G filters). In this way, using the color filter array of four colors with part of the G filters replaced by the E filters can improve the reproducibility of high frequency components of luminance, can reduce the jagginess, and can improve the resolution.

Figure 19:
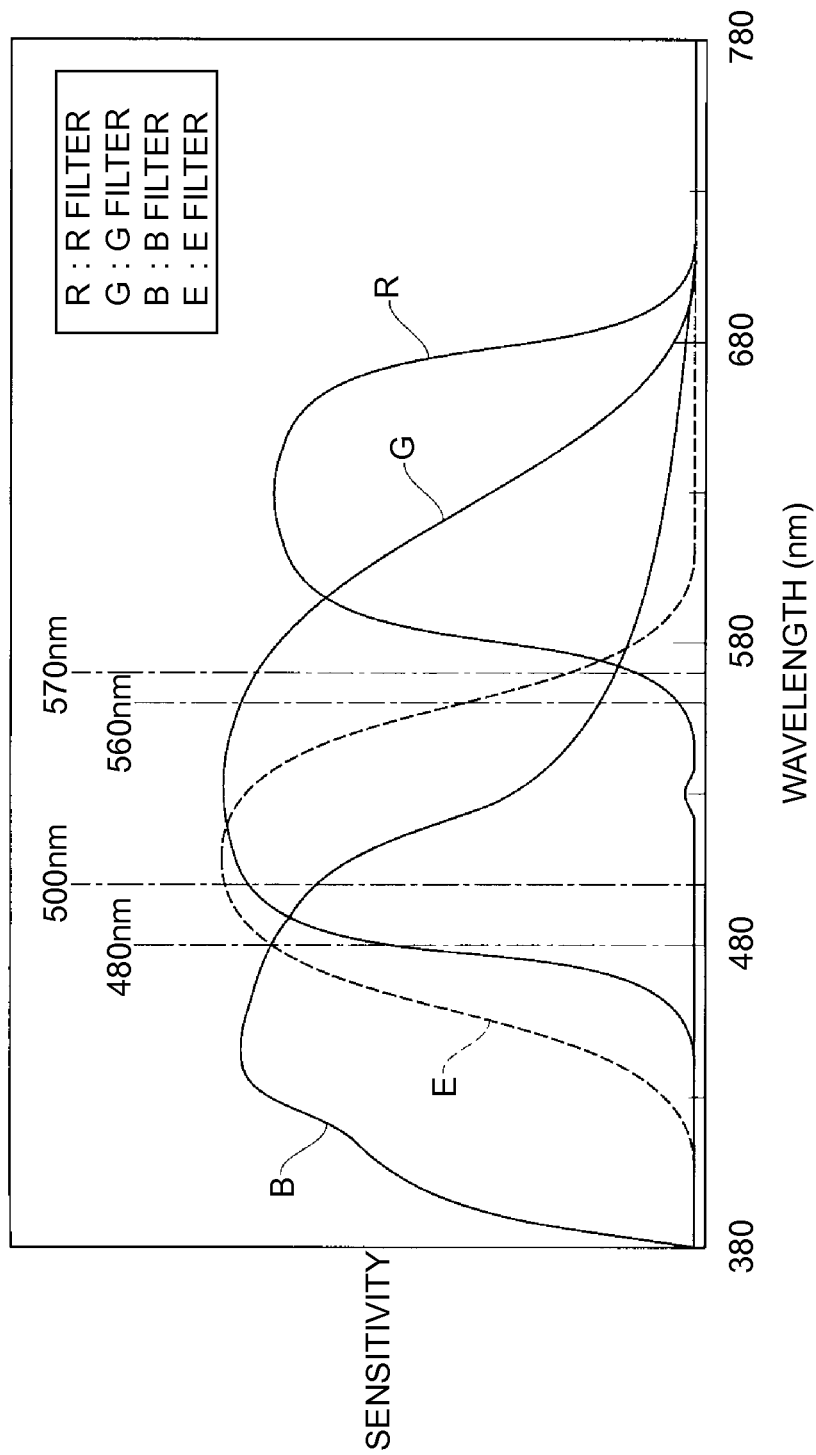
FIG. 19 is a graph showing spectral sensitivity characteristics of a light receiving element provided with an R filter, a G filter, a B filter, and an emerald filter E (E filter).
Figure 20:
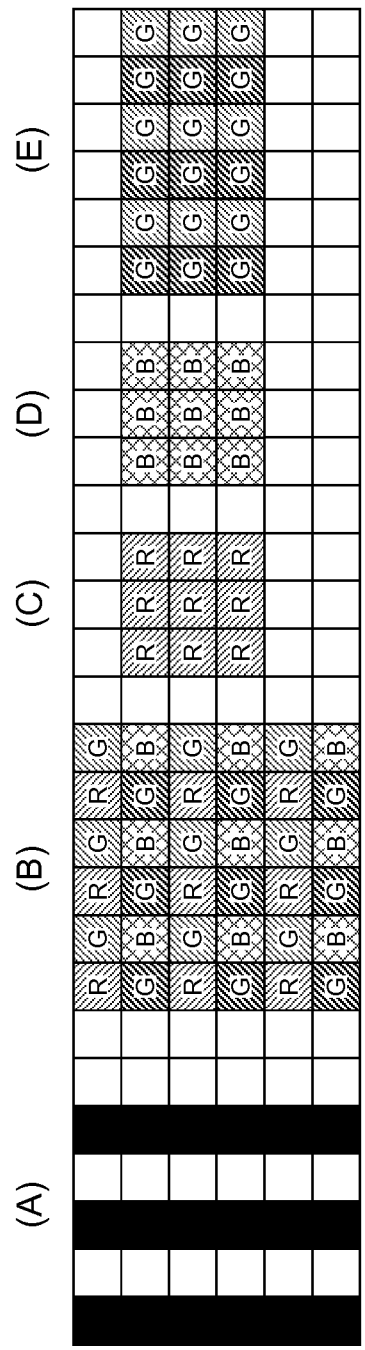
FIG. 20 is a diagram used to explain a problem of a color imaging element with color filters in a conventional Bayer array.
Figure 21:
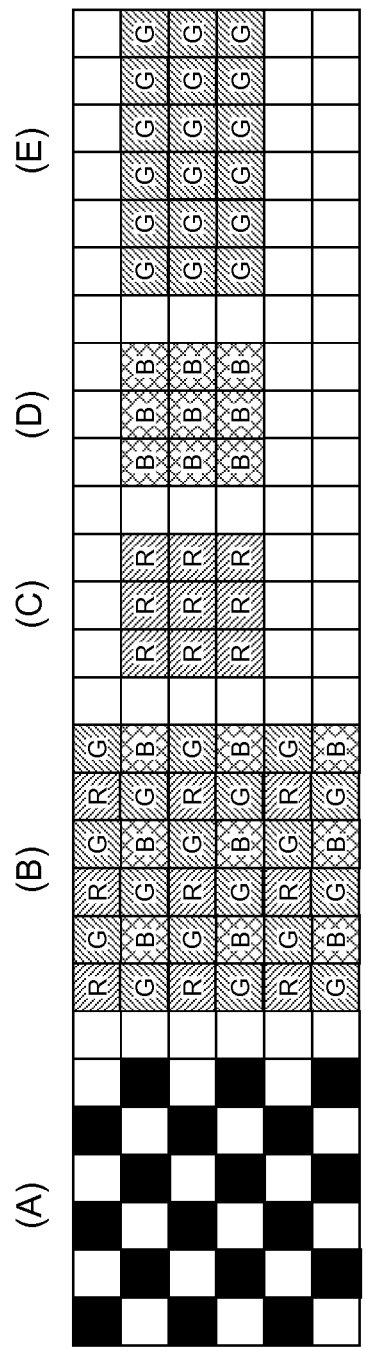
FIG. 21 is another diagram used to explain a problem of a color imaging element with color filters in a conventional Bayer array.

In FIG. 19 showing the spectral sensitivity characteristics of the color filter array (light receiving elements), the peak of the transmittance of the emerald filters E (peak of the sensitivity of the E pixels) is in the range of wavelength 480 nm or more and 570 nm or less. The transmittance of the emerald filters E is in the range of wavelength 500 nm or more and 560 or less and is higher than the transmittance of the RB filters. Therefore, the emerald filters E satisfy the conditions (2) and (3). In the color filter array, since part of the G filters corresponding to the G color that most contributes to the luminance signals among the three primary colors of RGB are replaced by the emerald filters E, the condition (4) is also satisfied.

Although the wavelength of the peak of the emerald filters E is shorter than that of the G filters in the spectral characteristics shown in FIG. 19, the wavelength of the peak is longer than that of the G filters (color looks a little closer to yellow) in some cases. In this way, the emerald filters E satisfying the conditions of the present invention can be selected, and for example, the emerald filters E satisfying the condition (1) can also be selected.

<Other Types of Color>

Although the color filter arrays formed by the color filters of primary colors RGB have been described in the embodiments, the present invention can also be applied to, for example, color filter arrays with color filters of four complementary colors including G in addition to C (cyan), M (magenta), and Y (yellow) that are complementary colors of the primary colors RGB. In this case, color filters satisfying any of the conditions (1) to (4) are the first filters of the present invention, and the other color filters are the second filters.

<Honeycomb Arrangement>

The color filter arrays of the embodiments include the basic array patterns including the color filters of each color two-dimensionally arranged in the horizontal direction (H) and the vertical direction (V), and the basic array patterns are repeatedly arranged in the horizontal direction (H) and the vertical direction (V). However, the present invention is not limited to this.

For example, a basic array pattern in a so-called honeycomb array shape including one of the basic array patterns of the embodiments rotated by 45° about the optical axis may be used, and the color filters may be formed by an array pattern including the basic array pattern repeatedly arranged in the oblique directions (NE, NW).

Although the embodiments are used to describe the present invention, the technical scope of the present invention is not limited to the scope described in the embodiments. It is apparent to those skilled in the art that the embodiments can be changed or improved in various ways. Furthermore, the present invention is not limited to the embodiments, and it is obvious that various modifications can be made without departing from the spirit of the present invention.

What is claimed is:

1. A single-plate color imaging element including color filters arranged on a plurality of pixels formed by photoelectric conversion elements arranged in horizontal and vertical directions, wherein
    each of the plurality of the pixels is square,
    an array of the color filters on the plurality of the square pixels includes a basic array pattern of M×N (M, N: integers 4 or more, at least one of M and N is an odd number, and M≠N) provided with first filters corresponding to a first color with one or more colors and second filters corresponding to a second color with two or more colors with contribution ratios for obtaining luminance signals lower than the first color, the basic array pattern is repeatedly arranged in the horizontal and vertical directions,
    the first filters are arranged in a check pattern shape in the basic array pattern,
    one or more second filters corresponding to each color of the second color are arranged in each line in the horizontal and vertical directions of the array of the color filters in the basic array pattern, and
    a proportion of the number of pixels of the first color corresponding to the first filters is greater than a proportion of the number of pixels of each color of the second color corresponding to the second filters.

2. The color imaging element according to claim 1, wherein
    one or more first filters are arranged in each line in the horizontal, vertical, lower right, and upper right directions of the array of the color filters.

3. The color imaging element according to claim 1, wherein
    one or more second filters corresponding to each color of the second color is arranged in each line in the horizontal, vertical, lower right, and upper right directions of the array of the color filters.

4. The color imaging element according to claim 1, wherein
    the first color is green (G), and the second color are red (R) and blue (B).

5. The color imaging element according to claim 4, wherein
    the color filters include R filters, G filters, and B filters corresponding to the colors of red (R), green (G), and blue (B), and
    in the basic array pattern, the R filters, the G filters, and the B filters are arranged so that the color filters of the same color are not adjacent in the horizontal and vertical directions of the array of the color filters.

6. The color imaging element according to claim 4, wherein
    the color filters include R filters, G filters, and B filters corresponding to the colors of red (R), green (G), and blue (B), and
    in the basic array pattern, the R filters, the G filters, and the B filters are arranged in the upper right or lower right direction of the array of the color filters.

7. The color imaging element according to claim 4, wherein
    the color filters include R filters, G filters, and B filters corresponding to the colors of red (R), green (G), and blue (B), and
    in the basic array pattern, the R filters and the B filters are arranged so that the number of the R filters and the number of the B filters are the same or the difference between the number of the R filters and the number of the B filters is 1, and the R filters and the B filters are irregularly arranged.

8. The color imaging element according to claim 1, wherein
    the ratio of the pixel number of the first color corresponding to the first filters and the pixel number of each color of the second color corresponding to the second filters is 2:1.

9. An imaging apparatus comprising the color imaging element according to claim 1.

10. A single-plate color imaging element including color filters arranged on a plurality of pixels formed by photoelectric conversion elements arranged in horizontal and vertical directions, wherein
    each of the plurality of the pixels is square,
    an array of the color filters on the plurality of the square pixels includes a basic array pattern including k sub-arrays (k: integer 2 or more) of M×N (M, N: integers, at least one of M and N is an odd number, and M≠N) provided with first filters corresponding to a first color with one or more colors and second filters corresponding to a second color with two or more colors with contribution ratios for obtaining luminance signals lower than the first color, the basic array pattern is repeatedly arranged in the horizontal and vertical directions,
    the first filters are arranged in a check pattern shape in the sub-arrays,
    one or more second filters corresponding to each color of the second color are arranged in each line in the horizontal and vertical directions of the array of the color filters in the basic array pattern, and
    a proportion of the number of pixels of the first color corresponding to the first filters is greater than a proportion of the number of pixels of each color of the second color corresponding to the second filters.

11. The color imaging element according to claim 10, wherein
the M is 3, the N is greater than the M,
the k is 2, and
the basic array pattern is formed by arranging two sub-arrays so that the number of pixels is 2M×N.

12. The color imaging element according to claim 10, wherein
the N is 3, the M is smaller than the N,
the k is 4, and
the basic array pattern is formed by arranging four sub-arrays so that the number of pixels is 2M×2N.

13. The color imaging element according to claim 10, wherein
the first color is a green (G) color, and the second color is a red (R) color and a blue (B) color.

14. The color imaging element according to claim 13, wherein
the color filters include R filters, G filters, and B filters corresponding to the colors of red (R), green (G), and blue (B), and
in the sub-arrays, the R filters, the G filters, and the B filters are arranged so as not to be adjacent in the horizontal and vertical directions of the array of the color filters.

15. The color imaging element according to claim 13, wherein
the color filters include R filters, G filters, and B filters corresponding to the colors of red (R), green (G), and blue (B), and
in the sub-arrays, the R filters, the G filters, and the B filters are arranged in the upper right or lower right direction of the array of the color filters.

16. The color imaging element according to claim 13, wherein
the color filters include R filters, G filters, and B filters corresponding to the colors of red (R), green (G), and blue (B), and
in the sub-arrays, the R filters and the B filters are arranged so that the number of the R filters and the number of the B filters are the same or the difference between the number of the R filters and the number of the B filters is 1, and the R filters and the B filters are irregularly arranged.

* * * * *